US008452004B2

(12) United States Patent
Lee

(10) Patent No.: US 8,452,004 B2
(45) Date of Patent: May 28, 2013

(54) MULTI-PIECE MOBILE MEDIA DEVICE ENCLOSURE

(75) Inventor: Edmund S. Lee, Los Angeles, CA (US)

(73) Assignee: Belkin International, Inc., Playa Vista, CA (US)

(*) Notice: Subject to any disclaimer, the term of this patent is extended or adjusted under 35 U.S.C. 154(b) by 473 days.

(21) Appl. No.: 12/726,341

(22) Filed: Mar. 17, 2010

(65) Prior Publication Data

US 2010/0240427 A1 Sep. 23, 2010

Related U.S. Application Data

(60) Provisional application No. 61/161,062, filed on Mar. 17, 2009.

(51) Int. Cl.
*H04M 1/00* (2006.01)

(52) U.S. Cl.
USPC ...................... 379/433.11; 379/426; D14/250

(58) Field of Classification Search
USPC .................. 379/428.01, 426, 433.11–433.13, 379/440; 455/550.1; 700/226; D3/218; D14/202, 250, 345, 425, 440, 477, 479, 480.5, D14/480.6, 501
See application file for complete search history.

(56) References Cited

U.S. PATENT DOCUMENTS

| | | | | |
|---|---|---|---|---|
| D582,149 | S | | 12/2008 | Tan |
| D646,264 | S | * | 10/2011 | Dong ........................... D14/250 |
| 2001/0027356 | A1 | | 10/2001 | Okamura |
| 2004/0204025 | A1 | | 10/2004 | Siddiqui |

OTHER PUBLICATIONS

Flung, Speck's See Thru translucent cases now available for iPhone 3G [online] Aug. 2008, http://www.krunker.com/2008/08/18/specks-seethru-translucent-cases-now-available-for-iphone-3g, Figures 1 and 3, 7 pages. Aug. 21, 2010.
International Search Report for International Application No. PCT/US10/27738, 10 pages. Apr. 28, 2010.

* cited by examiner

*Primary Examiner* — Md S Elahee
(74) *Attorney, Agent, or Firm* — Bryan Cave LLP

(57) ABSTRACT

A mobile media device case can include: (a) a first portion, the first portion comprising a first back wall and one or more first sidewalls, the first back wall and the one or more first sidewalls at least partially define a first interior of the first portion and a first exterior of the first portion, the first interior is configured to receive and partially cover at least a first part of the back section and the one or more side sections of the mobile media device; and (b) a second portion, the second portion comprising a second back wall and one or more second sidewalls, the second back wall and the one or more second sidewalls at least partially define a second interior of the second portion and a second exterior of the second portion. Other embodiments and related methods are also disclosed herein.

26 Claims, 15 Drawing Sheets

MULTI-PIECE MOBILE MEDIA DEVICE ENCLOSURE

CROSS REFERENCE TO RELATED APPLICATION

This application claims priority to U.S. Provisional Patent Application 61/161,062, filed on Mar. 17, 2009, the contents of which are incorporated herein by reference.

FIELD OF THE INVENTION

This invention relates generally to portable device enclosures, and relates, more particularly, a case/enclosure for a portable media player or smartphone including apparatuses and related methods thereto.

BACKGROUND

The portable media player market has changed dramatically in the past several years and with it, the portable media player enclosure market. Recent trends have focused on the emergence of the smartphone, which simply put is a handheld phone incorporating several additional features not found in traditional handheld phones.

Smartphones can include one or more of the following features: the merging of a personal data/digital assistant (PDA) and a cellular phone; a keyboard interface (e.g., a QWERTY keyboard) configuration as either a touch screen or tactile keyboard; the capability to receive/download audio/video files. Furthermore, smartphones can: run an operating system software providing a standardized interface and platform for application developers; include advanced features like e-mail, Internet access and e-book reader capability; and/or (c) include a built-in full keyboard or external USB keyboard and VGA connector. In other words, a smartphone can be considered a miniature computer that has telephone capability. One example of a smartphone is the iPhone® product by Apple Inc. of Cupertino, Calif. Another example of a smartphone is the Blackberry® product by Research In Motion (RIM) of Waterloo, Ontario, Canada.

Following the introduction of smartphones, smartphone cases were introduced. Unfortunately, current smartphone cases have many shortcomings. For example, current smartphone cases do not provide the protection most sophisticated smartphones need. That is, current smartphone cases do not provide adequate protection from both major damage caused by, for example, dropping the smartphone and minor damage caused by, for example, scratches inflicted by day-to-day use. This requirement for protecting the smartphone from major damage is substantially different from protecting the smartphone from minor damage. Typically, a smartphone case will either primarily address protection from major damage, caused by dropping and the like, or minor damage, caused by scratching. Cases that primarily address scratching protection tend to be manufactured from flexible materials and generally are designed not to scratch the mobile device. These cases are often called soft cases or enclosures. Unfortunately, protecting a mobile device from scratch damage can leave a customer with an unsatisfactory user experience because it does not protect the mobile device when dropped.

Alternatively, cases that primarily address major damage, such as dropping damage, tend to be manufactured from non-flexible, hard materials. These cases are often called hard cases or enclosures. However, smartphones can be difficult to remove from the hard cases and thus annoy the user. Additionally, both hard case and soft case designs can present difficulty for a user to access controls (e.g., buttons) on the side of the case, which is typically covered by the case/enclosure.

Therefore, a need exists in the art to develop a smartphone case or enclosure that will provide protection from both scratch and dropping damage, along with easy smartphone removal and access to control buttons.

BRIEF DESCRIPTION OF THE DRAWINGS

The invention will be better understood from a reading of the following detailed description of examples of embodiments, taken in conjunction with the accompanying figures in the drawings in which.

Figure 1:
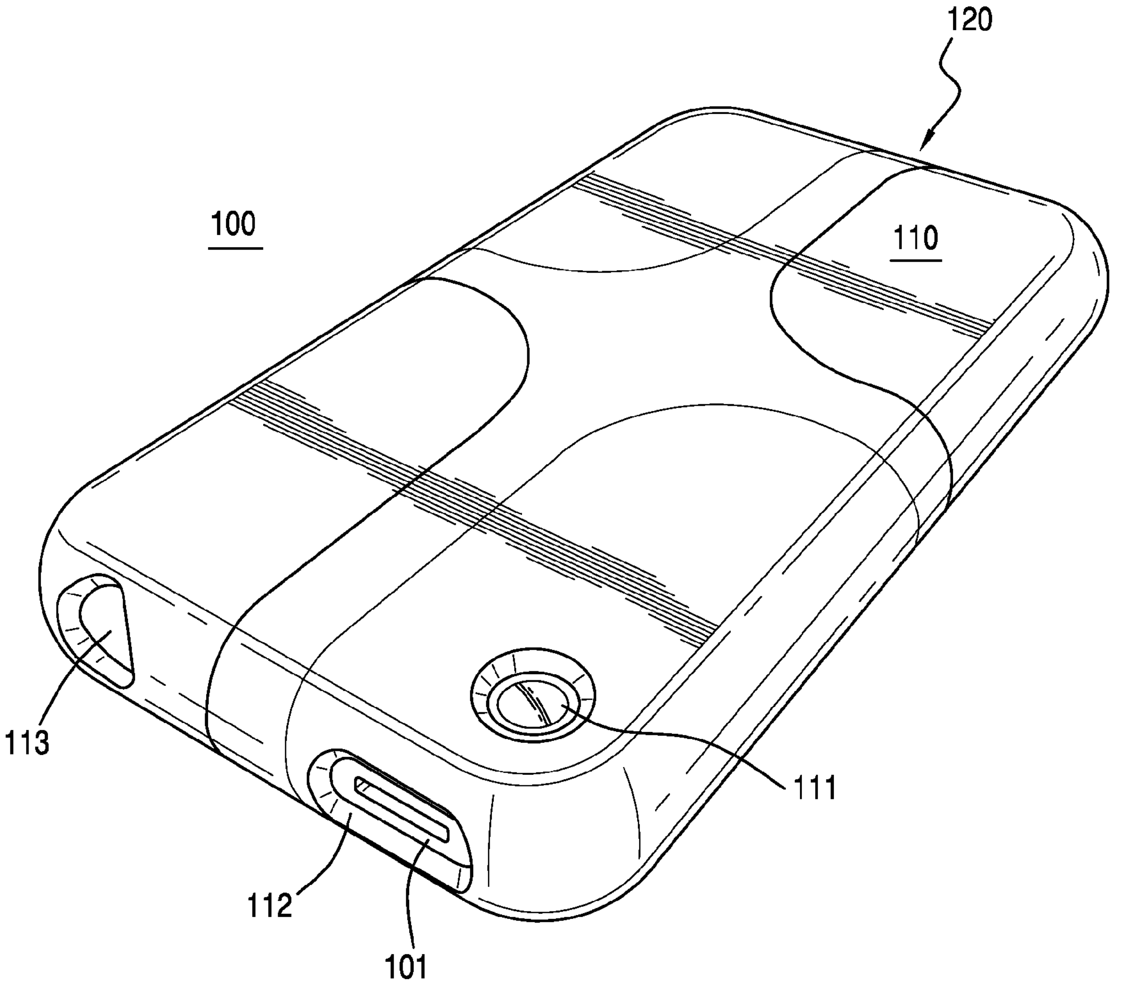
FIG. 1 illustrates a perspective view of the rear of a first embodiment of an exemplary case device for providing protection of a mobile media device, in accordance with the subject matter described herein.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled but not be mechanically or otherwise coupled; two or more mechanical elements may be mechanically coupled, but not be electrically or otherwise coupled; two or more electrical elements may be mechanically coupled, but not be electrically or otherwise coupled. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

DETAILED DESCRIPTION

In some embodiments, a mobile media device case can be configured to receive a mobile media device. The mobile media device includes a back section and two or more side sections. The mobile media device case also can include: (a) a first portion, the first portion comprising a first back wall and one or more first sidewalls, the first back wall and the one or more first sidewalls at least partially define a first interior of the first portion and a first exterior of the first portion, the first interior is configured to receive and partially cover at least a first part of the back section and the one or more side sections of the mobile media device; and (b) a second portion, the second portion comprising a second back wall and one or more second sidewalls, the second back wall and the one or more second sidewalls at least partially define a second interior of the second portion and a second exterior of the second portion, the second interior is configured to receive the first exterior of the first portion and partially cover at least a second part of the back section and the one or more side sections of the mobile media device. The first portion and the second portion are configured such that the first interior of the first portion and the second interior of the second portion form a case interior having a substantially uniform surface when the first exterior of the first portion is received within the second interior of the second portion. The first portion and the second portion are further configured such that the first exterior of the first portion and the second exterior of the second portion form a case exterior having a substantially uniform surface when the first exterior of the first portion is received within the second interior of the second portion.

In other embodiments, a mobile media case system configured to enclose a mobile media device. The mobile media device includes a back section and two or more side sections. A mobile media case system include: (a) a case, the case having: (a) a first section, the first section of the case including a first back wall and one or more first sidewalls, the first back wall and the one or more first sidewalls at least partially define a first interior of the first section and a first exterior of the first section, the first interior of the first section is configured to enclose and partially cover the back section and at least a first one of the two or more side sections of the mobile media device; and (b) a second section, the second section of the case including a second back wall and one or more second sidewalls, the second back wall and the one or more second sidewalls at least partially define a second interior of the second section and a second exterior of the second section, the second interior of the second section is configured to receive the first exterior of the first section and partially cover the back section and at least a second one of the two or more side sections of the mobile media device. The first section and the second section are configured such that the first interior of the first section and the second interior of the second section form a case interior having a substantially uniform surface when the first exterior of the first section is received within the second interior of the second section. The first section and the second section are further configured such that the first exterior of the first section and the second exterior of the second section form a case exterior having a substantially uniform surface when the first exterior of the first section is received within the second interior of the second section. The first part of the first exterior of the first section can be a first color. The second part of the second exterior of the second section can be a second color. The case is configured such that at least a second part of the second exterior of the second section overlays at least a first part of the first exterior of the first section such that a first part of the surface of the case exterior has a third color when the first exterior of the first section is received within the second interior of the second section. The third color is different from the first color and the second color.

In yet further embodiments, a method of manufacturing a mobile media device case can include: providing at least one machine tool for producing the mobile media device case; manufacturing the mobile media device case using the at least one machine tool such that mobile media device case includes: (a) a first portion, the first portion comprising a first back wall and one or more first sidewalls, the first back wall and the one or more first sidewalls at least partially define a first interior of the first portion and a first exterior of the first portion, the first interior is configured to receive and partially cover at least a first part of a back section and one or more side sections of the mobile media device; and (b) a second portion, the second portion comprising a second back wall and one or more second sidewalls, the second back wall and the one or more second sidewalls at least partially define a second interior of the second portion and a second exterior of the second portion, the second interior is configured to receive the first exterior of the first portion and partially cover at least a second part of the back section and the one or more side sections of the mobile media device, and wherein: the first portion and the second portion are configured such that the first interior of the first portion and the second interior of the second portion form a case interior having a substantially uniform surface when the first exterior of the first portion is received within the second interior of the second portion; and the first portion and the second portion are further configured such that the first exterior of the first portion and the second exterior of the second portion form a case exterior having a substantially uniform surface when the first exterior of the first portion is received within the second interior of the second portion; and distributing the mobile media device case.

FIG. 1 illustrates a perspective view of the rear of a first embodiment of an exemplary case device for providing protection of a mobile media device. FIG. 1 shows a mobile media case system 100 that includes mobile media device case 110. Mobile media case system 100 and mobile media device case 110 are merely exemplary are not limited to the embodiments presented herein. Mobile media case system 100 and mobile media device case 110 can be employed in many different embodiments or examples not specifically depicted or described herein.

The terms “mobile media device” should be broadly understood and include electrical devices of all types and designs (e.g., smartphones, media players, telephones, audio-visual media players, and devices incorporating media players, telephones, and/or audio-visual devices). Examples of mobile media devices include smartphones, cellular (or mobile) telephones, laptop computers, audio playback devices, AM (amplitude modulated) and FM (frequency modulated) radios, CD (compact disk) players, and media (e.g., MP3 (MPEG Audio Layer-3)) players.

Figure 2:
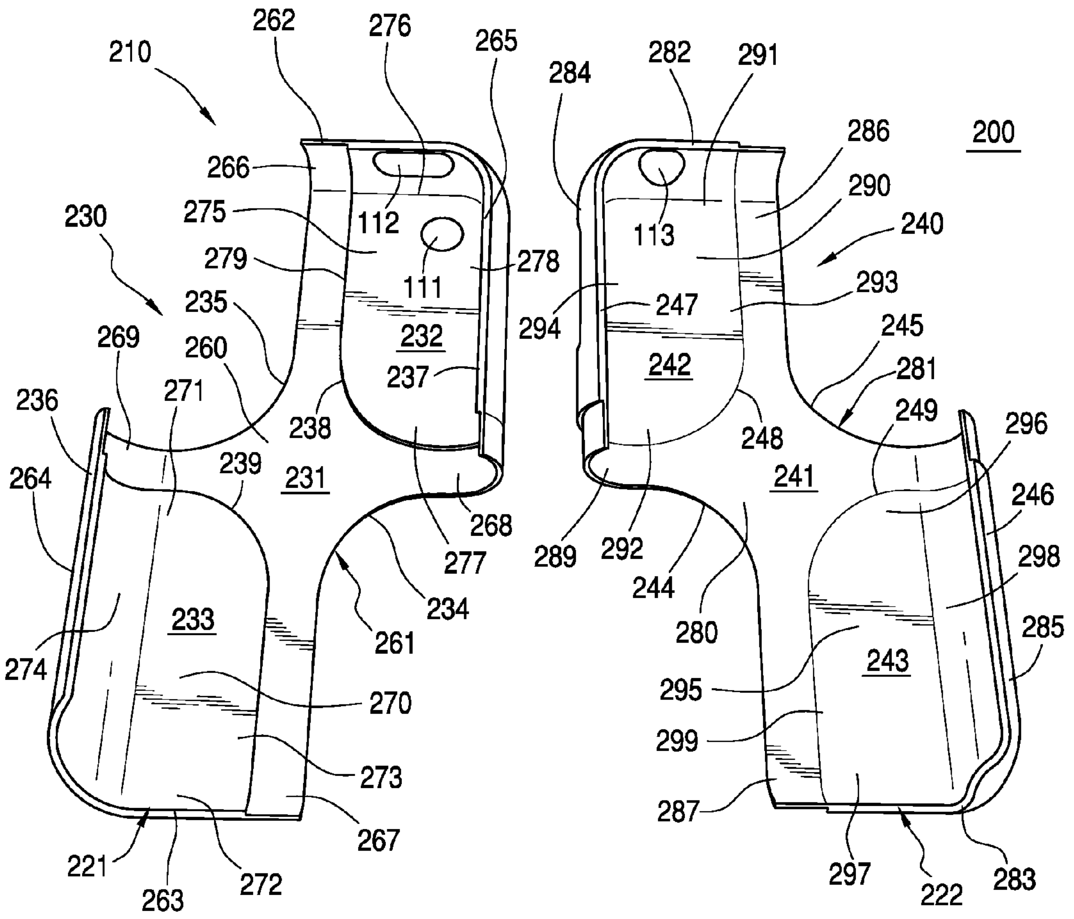
FIG. 2 illustrates a multi-piece, dismantled front view of the mobile media device case of FIG. 1, in accordance with the subject matter described herein.

Referring to FIG. 1, mobile media device case 110 encloses a mobile media device 101. Mobile media device case 110 can be a multiple-piece mobile media device case that includes: (a) a first section 230 (FIG. 2); (b) a second section 240 (FIG. 2); (c) hardware interface portion 120; (d) camera lens well 111; (e) power switch portion 112; and (f) headphone jack connector portion 113. Camera lens well 111, power switch portion 112, headphone jack connector portion 113, as well as other access areas (detailed below) are user access areas that allow a user to interact with specific user controls (e.g., buttons, switches) in the mobile media device that can be encased within mobile media device case 110.

Hardware interface portion 120 can be configured to facilitate the mechanical and electrical coupling of a mobile media device case 110 to connect to an exterior device, such as, for example, a computing device via a charge or charge/synchronization cable or a hardware interface dock connector of the mobile digital media device. In some embodiments, hardware interface portion 120 is configured as an area or portion removed (i.e., hole 921 (FIG. 9)) from mobile media device case 110 to accommodate connecting the mobile media device enclosed within mobile media device case 110 to a proprietary or non-proprietary connector, such as, for example, a 30-pin connector designed to be used with an Apple® iPod® or iPhone® or iTouch® product. In another embodiment, hardware interface portion 120 is configured to accommodate connecting to the mobile media device using a USB (universal serial bus) connector, a micro USB connector, or the like. In other embodiments, hardware interface portion 120 is located along a different edge of mobile media device case 110 and may be configured differently as well. Hardware interface portion 120 is further detailed below.

In operation, mobile media device case 110 provides protection to a mobile media device 101 enclosed or encased within mobile media device case 110. Mobile media device case 110 can be manufactured from any suitable material, such as, polycarbonate or other semi-rigid or rigid material.

FIG. 2 illustrates a multi-piece, dismantled front view of mobile media device case 210. Mobile media case system 200 shows a media device case 210 that includes a first section 230 and a second section 240. First section 230 and second section 240 can be configured to mechanically coupled together to form media device case 210. Elements similarly numbered with the last two significant digits and described in FIG. 1 function in a substantially similarly way. In FIG. 2, media device case 210 may include elements not relevant to the present discussion.

FIG. 2 shows an interior view of first section 230 and second section 240. In some examples, first section 230 can have: (a) a back wall 261; (b) a top sidewall 262; (c) a bottom sidewall 263; (d) a left sidewall 264; and (e) a right sidewall 265. First section 230 is configured to form at least a portion of the back and sides (e.g., bottom left and upper right) of mobile media device case 110.

Furthermore, first section 230 can have interior main back portion 231; (b) upper right outer edge 237 and lower left outer edge 236. Interior main back portion 231 is bounded by upper right outer edge 237, lower left outer edge 236, upper left inner edge 235, lower right inner edge 234, and first hardware interface portion 221. Together, interior main back portion 231, upper right outer edge 237, and lower left outer edge 236 partially define the interior physical boundaries of mobile media device case 110 of FIG. 1. In one embodiment, interior main back portion 231, upper right outer edge 237 and lower left outer edge 236 cover a significant portion of a given mobile media device, for example at least approximately fifty percent (50%) of the back and sides of a mobile media device.

Back wall 261 can include: (a) main back portion 231; (b) an upper right back portion 232 defined by edge 238 and, in some embodiments, upper right outer edge 237; and (c) a lower left back portion 233 defined by edge 239 and, in some embodiments, lower left outer edge 236.

Main back portion 231 can have: (a) central portion 260; (b) a top 266; (c) a bottom 267; (d) a right side 268; and (e) a left side 269. Main back portion 231 can be configured to at least partially cover a central area of the back portion of mobile media device 101 (FIG. 1). Top 266 of main back portion 231 can be mechanically coupled to top sidewall 262. Bottom 267 of main back portion 231 can be mechanically coupled to bottom sidewall 263. Right side 268 of main back portion 231 can be mechanically coupled to right sidewall 265. Left side 269 of main back portion 231 can be mechanically coupled to left sidewall 264. Main back portion 231 can have a first thickness.

Right back portion 232 can have: (a) a central portion 275; (b) a top 276; (c) a bottom 277; (d) a right side 278; and (e) a left side 279. Left side 279 of right back portion 232 can be mechanically coupled to top 266 of main back portion 231. Bottom 277 of right back portion 232 can be mechanically coupled to right side 268 of main back portion 231. Top 276 of right back portion 232 can be mechanically coupled to top sidewall 262. Right side 278 of right back portion 232 can be mechanically coupled to right sidewall 265. Right back portion 232 can have a second thickness.

Left back portion 233 can have: (a) central portion 270; (b) a top 271; (c) a bottom 272; (d) a right side 273; and (e) a left side 274. Right side 273 of left back portion 233 can be mechanically coupled to bottom 267 of main back portion 231. Top 271 of left back portion 233 can be mechanically coupled to left side 269 of main back portion 231. Bottom 272 of left back portion 233 can be mechanically coupled to bottom sidewall 263. Left side 274 of left back portion 233 can be mechanically coupled to left sidewall 264. Left back portion 233 can have a third thickness.

In one embodiment, right back portion 232 and left back portion 233 are configured to include additional material beyond the material used for a central portion of interior main back portion 231. In the same or different embodiment, right back portion 232 and left back portion 233 are configured to use the same material as used for the central portion 260 of interior main back portion 231, but right back portion 232 and left back portion 233 have a height or thickness greater than the height or thickness of central portion 260 of interior main back portion 231. In other embodiments, right back portion 232 and left back portion 233 are part of interior main back portion 231 and have a height or thickness substantially similar to the height or thickness of the central portion 260 of interior main back portion 231.

Second section 240 is configured to form another part of the back and sides of mobile media device case 110. In some embodiments as described above, second section 240 is configured to mechanically couple to first section 230 to form mobile media device case 210, as described below.

In some examples, second section 240 can have: (a) a back wall 281; (b) a top sidewall 282; (c) a bottom sidewall 283; (d) a left sidewall 284; and (e) a right sidewall 285. Second section 240 is configured to form at least a portion of the back and sides (e.g., top left and lower right) of mobile media device case 110.

Second section 240 includes interior main back portion 241, upper left outer edge 247, and lower right outer edge 246. Interior main back portion 241 is bounded by upper left outer edge 247, lower right outer edge 246, upper right inner edge 245, lower left inner edge 244, and second hardware interface portion 222. Together, interior main back portion 241, upper left outer edge 247, and lower right outer edge 246 partially define the interior physical boundaries of mobile media device case 110 of FIG. 1. In one embodiment, interior main back portion 241, upper left outer edge 247 and lower right outer edge 246 cover a significant portion of a given mobile media device, for example, at least approximately fifty percent (50%) of the back and sides of a mobile media device.

Second section 240 can include: (a) interior main back portion 241; (b) an upper left back portion 242 defined by edge 248 and, in some embodiments, upper left outer edge 247; and (c) a lower right back portion 243 defined by edge 249 and, in some embodiments, lower right outer edge 246.

Main back portion 241 can have: (a) a central portion 280; (b) a top 286; (c) a bottom 287; (d) a right side 288; and (e) a left side 289. Main back portion 241 can be configured to at least partially cover a central portion 260 of first section 230. Top 286 of main back portion 241 can be mechanically coupled to top sidewall 282. Bottom 287 of main back portion 241 can be mechanically coupled to bottom sidewall 283. Right side 288 of main back portion 241 can be mechanically coupled to right sidewall 285. Left side 289 of main back portion 241 can be mechanically coupled to left sidewall 284. Main back portion 241 can have a fourth thickness.

Right back portion 243 can have: (a) a central portion 295; (b) a top 296; (c) a bottom 297; (d) a right side 298; and (e) a left side 299. Left side 299 of back portion 243 can be mechanically coupled to bottom 287 of main back portion 241. Top 296 of right back portion 243 can be mechanically coupled to right side 288 of main back portion 241. Bottom 297 of right back portion 243 can be mechanically coupled bottom sidewall 283. Right side 298 of right back portion 243 can be mechanically coupled to right sidewall 285. Right back portion 243 can have a fifth thickness.

Left back portion 242 can have: (a) a central portion 290; (b) a top 291; (c) a bottom 292; (d) a right side 293; and (e) a left side 294. Right side 293 of left back portion 242 can be mechanically coupled to top 286 of main back portion 241. Bottom 292 of left back portion 242 can be mechanically coupled to left side 289 of main back portion 241. Top 291 of left back portion 242 can be mechanically coupled to top sidewall 282. Left side 294 of left back portion 242 can be mechanically coupled to left sidewall 284. Left back portion 242 can have a sixth thickness.

In one embodiment, left back portion 242 and right back portion 243 can include additional material beyond the material used for a central portion 280 of interior main back portion 241. In the same or different embodiment, left back portion 242 and right back portion 243 are configured to use the same material as used for the central portion 280 of interior main back portion 241, but left back portion 242 and right back portion 243 have a height or thickness greater than the height or thickness of central portion 260 of interior main back portion 241. In other embodiments, left back portion 242 and right back portion 243 are part of interior main back portion 241 and have a height or thickness substantially similar to the height or thickness of the central portion of interior main back portion 241.

In some examples, first portion 230 can be selected from a group of two or more potential first portions. Second portion 240 can be selected from a group of two or more potential first portions. In various embodiments, the two or more potential first portions are interchangeable and the two or more potential second portions are interchangeable such that such that any one of the potential first portions can be coupled to any one of the potential second portions. In some examples, the user can select from a first portion from the group of potential first persons and select a second portion from the group of potential second portions.

Figure 3:
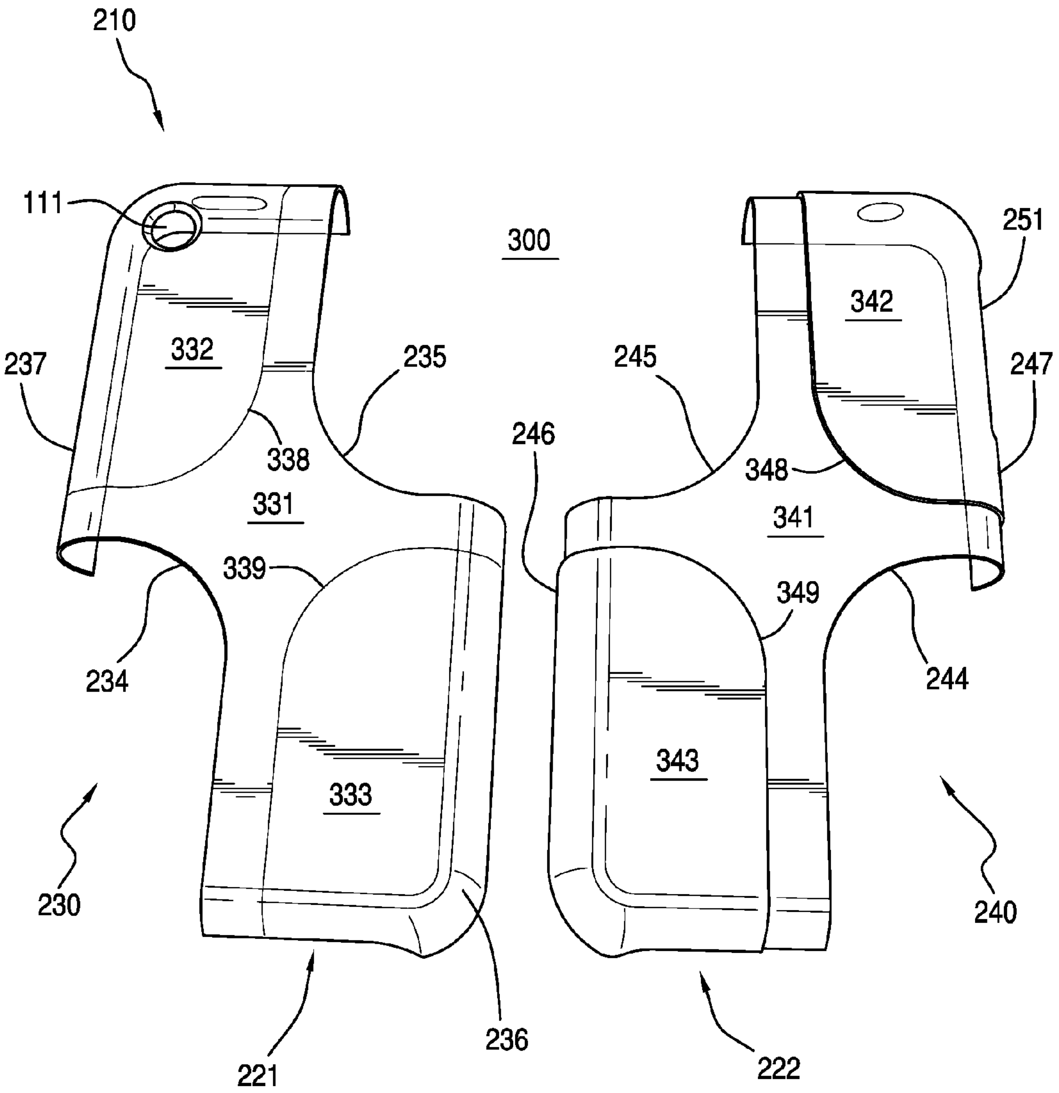
FIG. 3 illustrates a multi-piece, dismantled back view of the mobile media device case of FIG. 1, in accordance with the subject matter described herein.

FIG. 3 illustrates a multi-piece, dismantled back view of mobile media device case 210. Mobile media device system 300 includes media device case 210 that includes first section 230 and second section 240, as described in relation to FIG. 2 above. FIG. 3 shows a back or exterior view of first section 230 and second section 240. Elements similarly numbered with the last two significant digits and described in FIGS. 1 and 2 function in a substantially similarly way. In FIG. 3, media device case 210 may include elements not relevant to the present discussion.

As described above, first section 230 is configured to form a portion of the back and sides of mobile media device case 110. First section 230 includes exterior main back portion 331. Exterior main back portion 331 is a surface opposite interior main back portion 231 (FIG. 2). In one embodiment, interior main back portion 231 and exterior main back portion 331 are opposite sides of a single piece of material. In another embodiment, interior main back portion 231 and exterior main back portion 331 are manufactured as separate pieces of material and coupled together, for example using an adhesive.

In this example, interior main back portion 231 and exterior main back portion 331 are configured as opposite sides of a multi-piece material.

Exterior main back portion 331 is bounded by upper right outer edge 237, lower left outer edge 236, upper left inner edge 235, lower right inner edge 234, and first hardware interface portion 221. Together, exterior main back portion 331, upper right outer edge 237, and lower left outer edge 236 at least partially define the exterior physical boundaries of mobile media device case 110 of FIG. 1. Exterior main back portion 331 additionally includes an upper back portion 332 defined by edge 338 and, in some embodiments, upper right outer edge 237. Exterior main back portion 331 also includes a lower back portion 333 defined by edge 339 and, in some embodiments, lower left outer edge 236.

As described above, second section 240 is configured as a portion of the back and sides of mobile media device case 110 and additionally includes exterior main back portion 341. Exterior main back portion 341 is a surface opposite interior main back portion 241 of FIG. 2, above. In one embodiment, interior main back portion 241 and exterior main back portion 341 are opposite sides of a single piece of material. In another embodiment, interior main back portion 241 and exterior main back portion 341 are manufactured as separate pieces of material and coupled together, for example using an adhesive. In this example, interior main back portion 241 and exterior main back portion 341 are configured as opposite sides of a multi-piece material.

Exterior main back portion 341 is bounded by upper left outer edge 247 (including user interface portion 251), lower right outer edge 246, upper right inner edge 245, lower left inner edge 244 and first hardware interface portion 222. User interface portion 251 is a user access area that allows a user to interact with specific functions of the mobile media device 101 (FIG. 1). In some embodiments, user interface portion 251 is associated with "up" and "down" user interface controls of an iPhone® mobile media device.

Together, exterior main back portion 341, upper left outer edge 247, and lower right outer edge 246 at least partially define the exterior physical boundaries of mobile media device case 110 of FIG. 1. Exterior main back portion 341 additionally includes an upper back portion 342 defined by edge 348 and, in some embodiments, upper left outer edge 247. Exterior main back portion 341 also includes a lower back portion 343 defined by edge 349 and, in some embodiments, lower right outer edge 246.

In some embodiments, second section 240 of media device case 210 can be configured to attach to a mobile media device before first section 230 of media device case 210 attaches to the mobile media device. That is, second section 240 can be coupled to mobile media device 101 (FIG. 1). Afterwards, first section 230 can be coupled to second section 240 and/or the mobile media device. In the same or different embodiment, first section 230 can be coupled to second section 240, and then, first section 230 and second section 240 can be coupled to mobile media device 101 (FIG. 1). In the same or different embodiments, when first section 230 and second section 240 are coupled together, the central portions 260 and 280 (FIG. 2) of interior main back portions 231 and 241 (FIG. 2), respectively, overlap each other while right back portions 232 and 242 (FIG. 2) and left back portions 233 and 243 (FIG. 2) do not overlap each other.

Interior main back portion 231 (FIG. 2) and exterior main back portion 331 can be opposite surfaces of the same material. Interior main back portion 241 (FIG. 2) and exterior main back portion 341 can be opposite surfaces of the same material. Accordingly, in this particular embodiment, the height or thickness of a central portion of interior main back portion 231 refers to the perpendicular distance between a central portion of interior main back portion 231 and a central portion of exterior main back portion 331. The height or thickness of interior main back portion 241 refers to the perpendicular distance between a central portion of interior main back portion 241 and a central portion of exterior main back portion 341. Similarly, in this particular embodiment, the height or thickness of left back portion 242 refers to the perpendicular distance between left back portion 242 and upper back portion 342, and the height or thickness of upper back portion 332 refers to the perpendicular distance between upper back portion 332 and right back portion 232, and so on.

In some embodiment, it is desired for a substantial majority of the interior surface of media device case 210 to contact the mobile media device when the mobile media device is stored within media device case 210. That is, first section 230 and second section 240 are configured such that interior surface of first section 230 and interior of second section 240 form a case interior having a substantially uniform surface when the first section 230 is coupled to the second section 240. Additionally, first section 230 and the second section 240 are further configured such that the exterior of first section 230 and the exterior of second section 240 form a case exterior having a substantially uniform surface. In some examples, a substantially uniform surface is a surface is substantially smooth and substantially uniform in height. In some embodiments, a substantially uniform surface can have one or more holes, for example, camera lens well 111 and still be considered a substantially uniform surface. For example, the interior surface of mobile media device case 110 and the external surface of mobile media device case 210 are substantially uniform surfaces.

In various embodiments in creating a substantially uniform exterior and interior surfaces, a thickness of mobile media device case 210 can be substantially equal to the first thickness of main back portion 231 plus the fourth thickness of main back portion 241 when second section 240 overlies first section 230. Furthermore, each of the second thickness of right back portion 232, the third thickness of left back portion 233, the fifth thickness of right back portion 243, and the sixth thickness of left back portion 242 can be substantially equal to the thickness of mobile media device case 210.

In some examples, right back portion 232 and left back portion 233 are the interior parts. That is, the interior parts of right back portion 232 and left back portion 233 can be thicker or extend higher (e.g., twice as high) as main back portion 231. In this embodiment, right back portion 243 and left back portion 242 can be the exterior parts. That is, the exterior parts of right back portion 243 and left back portion 242 can extend higher (e.g., twice as high) as main part portion 231. Using this configuration, the exterior of media device case 210 is substantially smooth, despite being constructed of two overlapping pieces.

Additionally in some examples, when second section 240 of mobile media device case 110 is configured to attach to a mobile media device before first section 230 of media device case 210 attaches to the mobile media device, upper back portion 342 and lower back portion 343 are configured as part of exterior main back portion 341 and can use additional material beyond the material used for exterior main back portion 341, or use of the same material used for exterior main back portion 341, and have a height or thickness substantially similar to the height or thickness of the central portion of interior main back portion 231.

As a variation to the above-described embodiment, first section 230 of media device case 210 is configured to attach to a mobile media device before second section 240 of media device case 210 attaches to the mobile media device. In this embodiment, right back portion 232, left back portion 233, and main back portion 231 form a planar surface, and left back portion 242 and right back portion 243 are not planar with main back portion 241. Furthermore, the heights or thicknesses of upper back portion 332 and lower back portion 333 are approximately equal to a height or thickness of main back portion 241 plus main back portion 231. Additionally, the heights or thicknesses of exterior main back portion 231 and exterior main back portion 241 can be substantially similar to each other. In this configuration, the result is a substantially continuous surface of the interior portion and the exterior portion of media device case 210.

Figure 4:
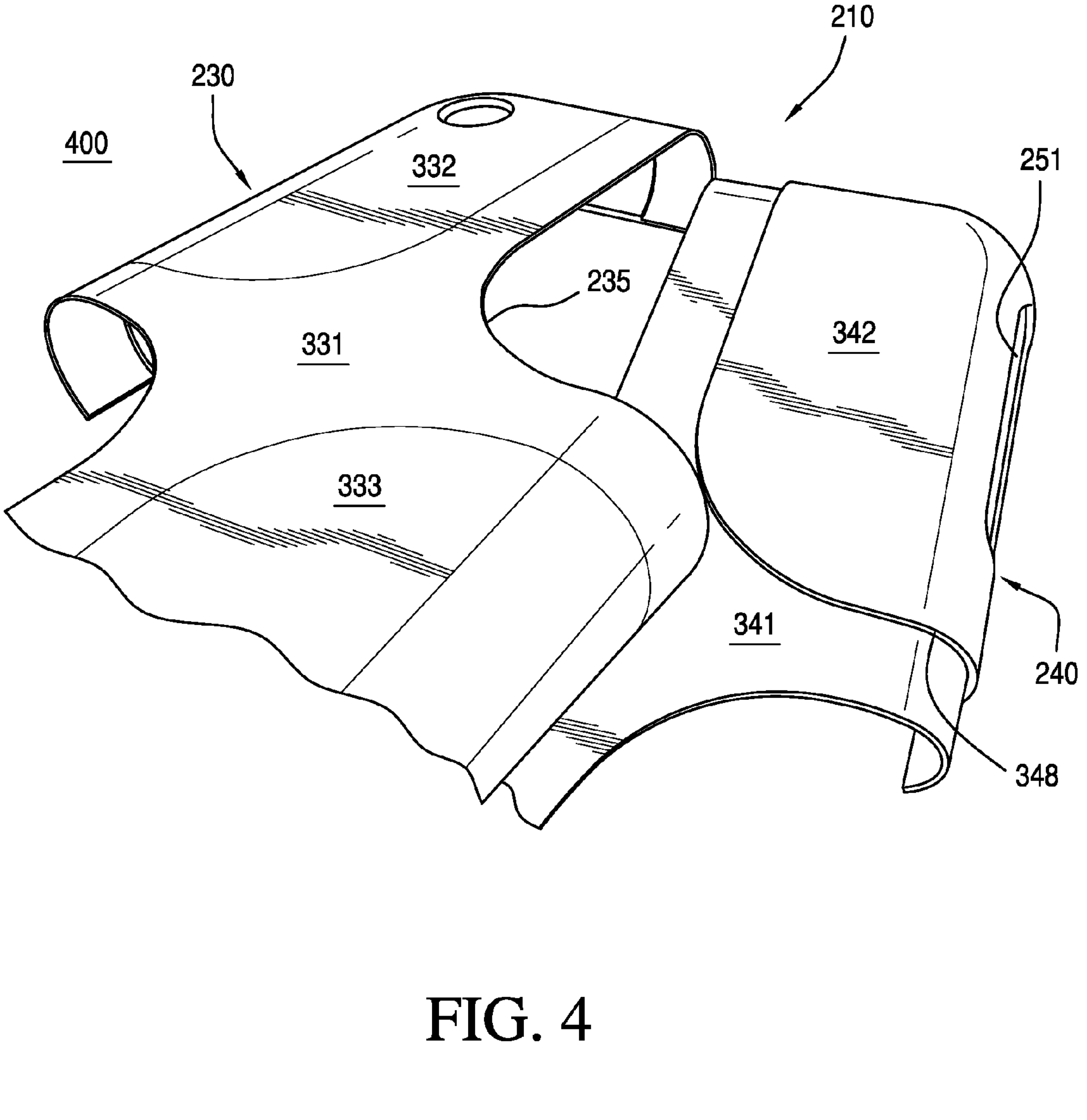
FIG. 4 illustrates a multi-piece, dismantled partial back view of the mobile media device case of FIG. 1 during the configuration or assembly process, in accordance with the subject matter described herein.

FIG. 4 illustrates a multi-piece, dismantled partial back view of mobile media device case 210 during the configuration or assembly process. In FIG. 4 for clarity, a user configuration of media device case 210 is described without a mobile media device present. In FIG. 4, media device case system 400 includes media device case 210 with first section 230 and second section 240, as described in FIGS. 2 and 3, above. Elements similarly numbered with the last two significant digits and described in FIGS. 1-3 function in a substantially similarly way. In FIG. 4, media device case 210 may include elements not relevant to the present discussion.

In some embodiments, a user configuring a media device case 210 can align first section 230 over second section 240. In this embodiment, the user aligns upper left inner edge 235 of first section 230 with edge 348 of upper back portion 342 of second section 240. Although not shown in FIG. 4, the user can alternatively rotate first section 230 one hundred eighty degrees)(180° and align upper left inner edge 235 of first section 230 with edge 349 (FIG. 3) of lower back portion 343 of second section 240. After proper alignment, the user applies sufficient force to first section 230 and second section 240 to lock in, snap, or otherwise complete the configuration of media device case 210.

Figure 5:
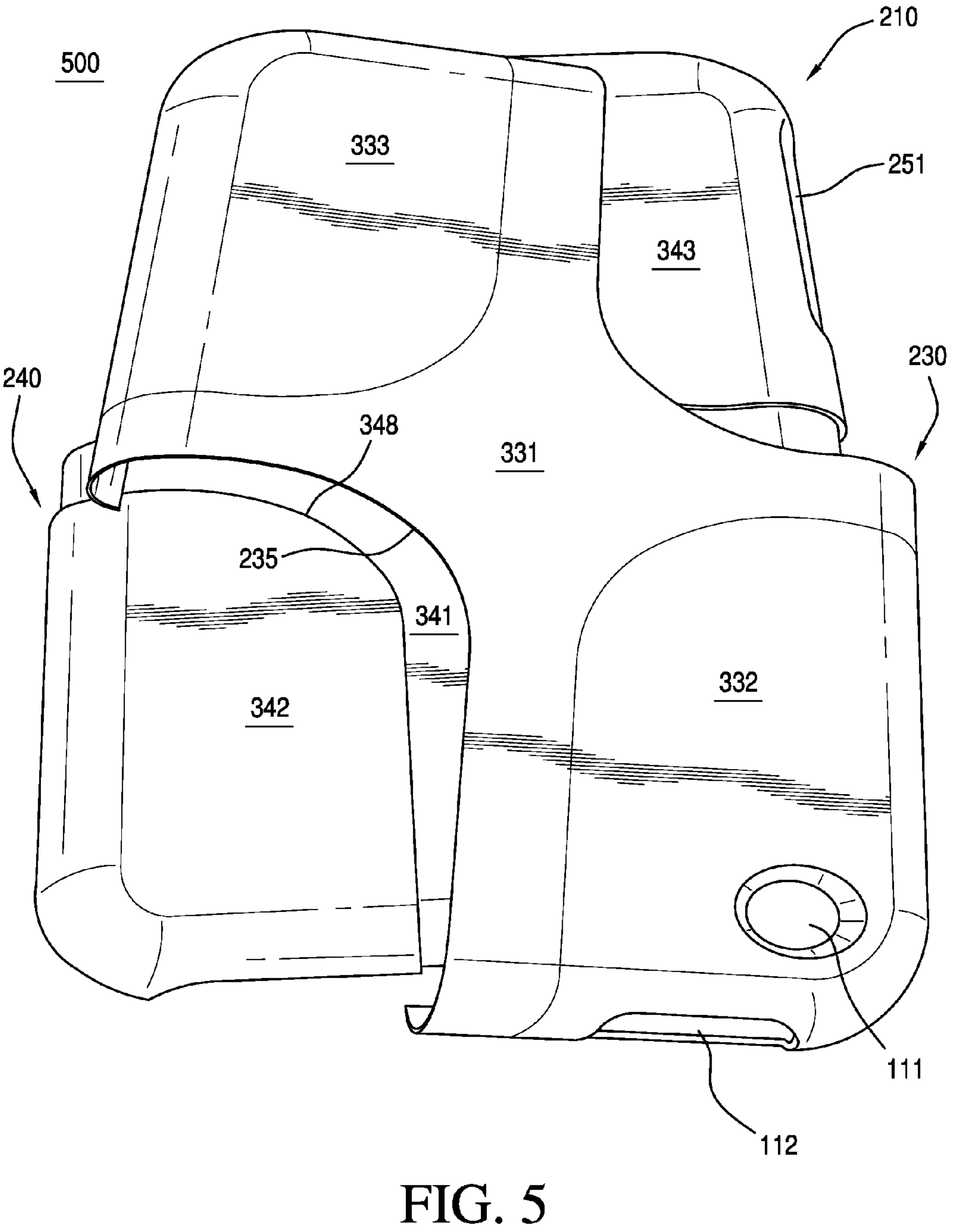
FIG. 5 illustrates another multi-piece dismantled back view of the mobile media device case of FIG. 1 during the configuration or assembly process, in accordance with the subject matter described herein.

FIG. 5 illustrates another multi-piece dismantled back view of mobile media device case 210 during the configuration or assembly process. In FIG. 5 for clarity, user configuration of media device case 210 is described without a mobile media device present. In FIG. 5, media device case system 500 shows media device case 210 with first section 230 and second section 240, as described in FIGS. 2 and 3, above. Elements similarly numbered with the last two significant digits and described in FIGS. 1-4 function in a substantially similarly way. In FIG. 5, media device case 210 may include elements not relevant to the present discussion.

As previously described, in some embodiments, a user configuring media device case 210 aligns first section 230 over second section 240. In this embodiment, the user aligns upper left inner edge 235 of first section 230 with edge 348 of upper back portion 342 of second section 240. After proper alignment, the user applies sufficient force to first section 230 and second section 240 to lock in, snap, or otherwise complete the configuration of media device case 210.

In some embodiments, first section 230 and second section 240 are manufactured from substantially similar materials having different colors that when configured as media device case 210 result in the central portion of exterior main back portion 331 having a third color, different than the first color and the second color. In these embodiments, the materials can be transparent or translucent. In other embodiments, first section 230 and second section 240 are manufactured from substantially similar materials having substantially similar colors that when configured as media device case 210 result in the central portion of exterior main back portion 331 having a substantially similar color. In these embodiments, the materials can be transparent, translucent, or opaque.

Figure 6:
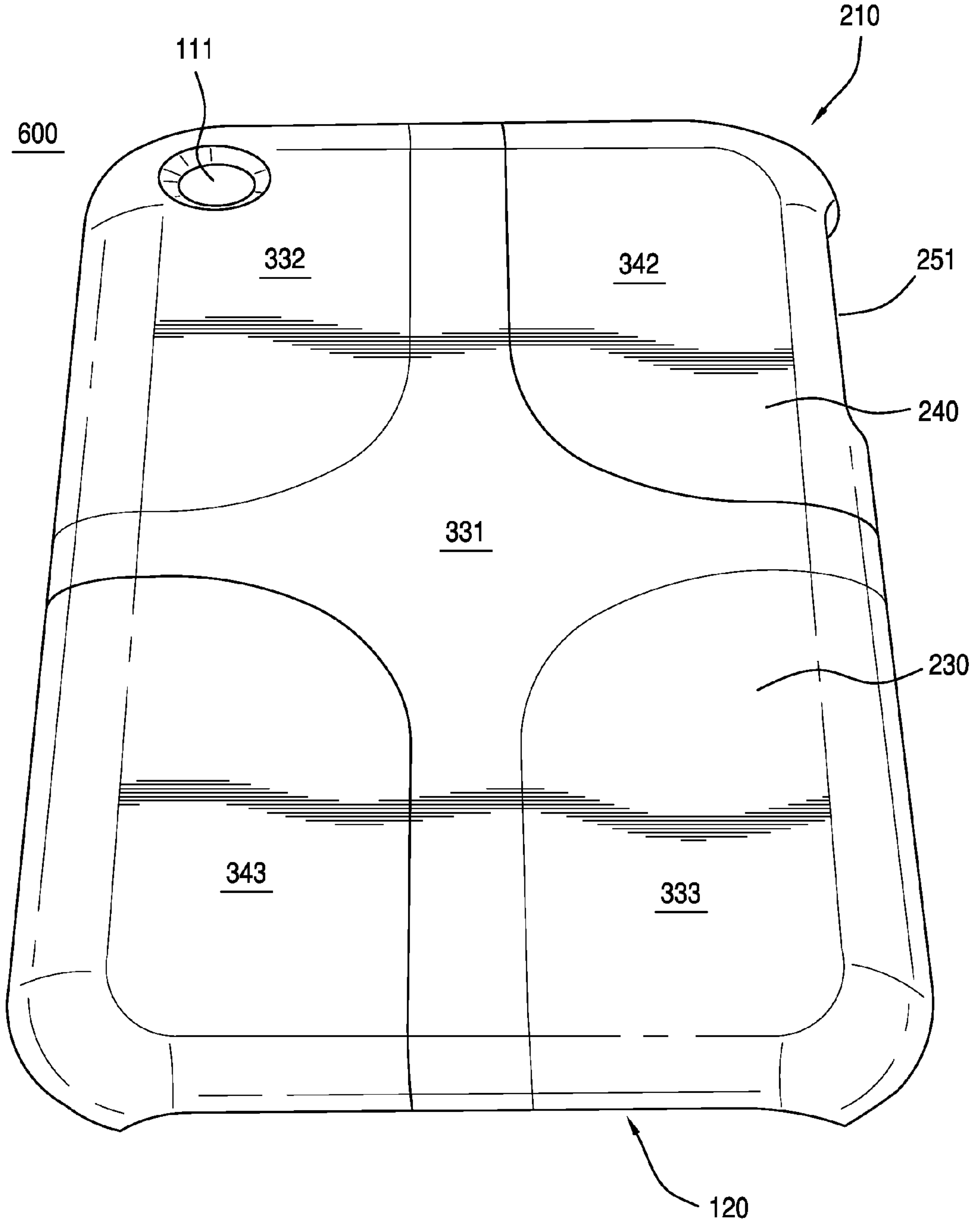
FIG. 6 illustrates a rear, back perspective view of the first embodiment of the fully assembled media device case of FIG. 1, in accordance with the subject matter described herein.

FIG. 6 illustrates a rear, back perspective view of the first embodiment of fully assembled media device case 210. In FIG. 6 for clarity, user configuration of media device case 210 is described without a mobile media device present. FIG. 6 shows media device case system 600 includes a media device case 210 that is fully assembled. In FIG. 6, media device case 210 includes first section 230 and second section 240, as described in FIGS. 2 and 3, overlying one another. Elements similarly numbered with the last two significant digits and described in FIGS. 1-5 function in a substantially similarly way. In FIG. 6, media device case 210 may include elements not relevant to the present discussion.

In FIG. 6, media device case 210 is a multiple-piece mobile media device case that includes: second section 240 including upper back portion 342 and lower back portion 343, and a first section 243 partially overlying the first section and having an exterior main back portion 31 upper back portion 332, and lower back portion 333. FIG. 6 illustrates an exterior view of a fully assembled media device case 210 after the user configuration or assembly process described in relation to FIGS. 4 and 5 above.

Figure 7:
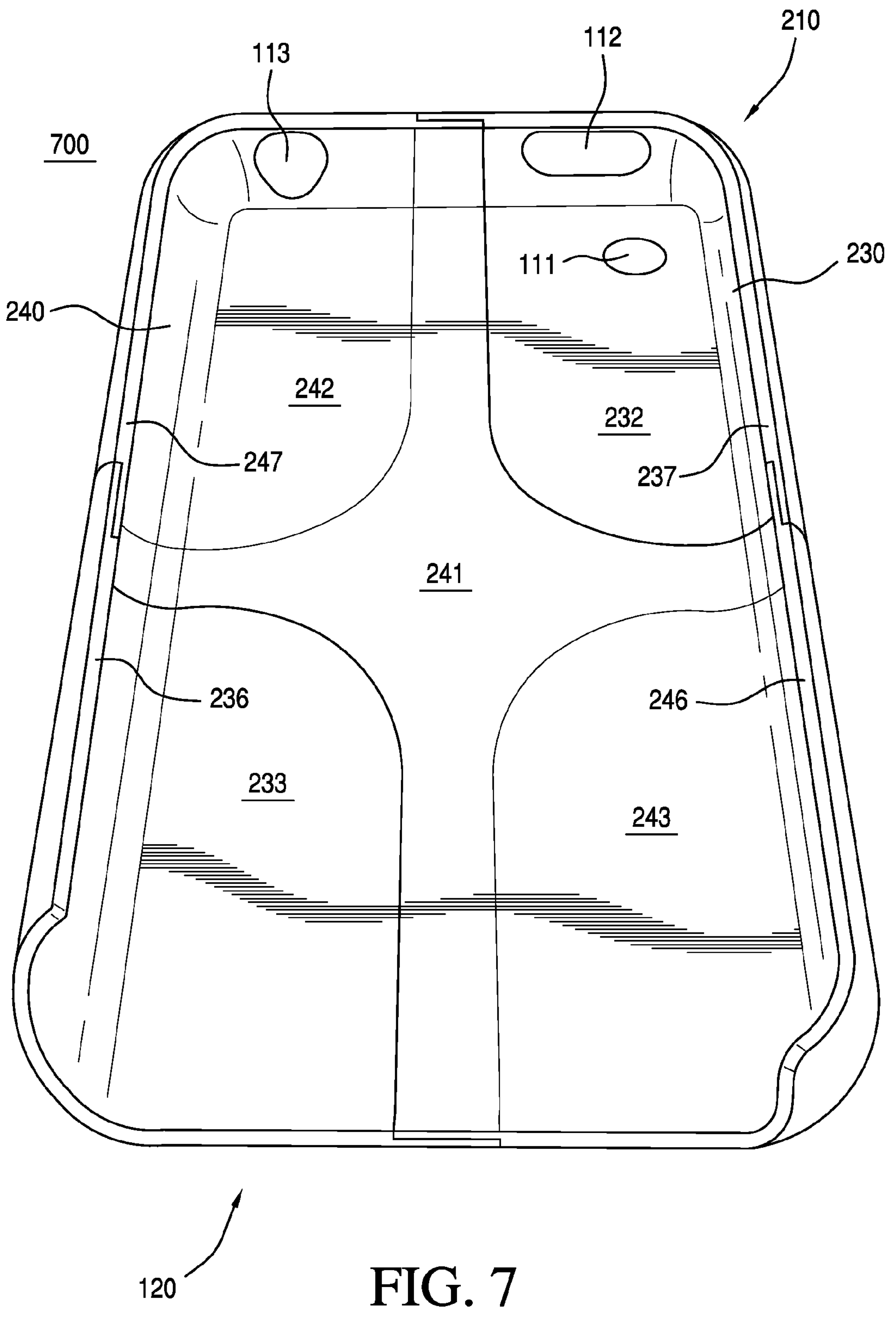
FIG. 7 illustrates a front, bottom perspective view of the first embodiment of the fully assembled media device case of FIG. 1, in accordance with the subject matter described herein.

FIG. 7 illustrates a front, bottom perspective view of the first embodiment of fully assembled media device case 210. In FIG. 7 for clarity, user configuration of media device case 210 is described without a mobile media device present. In FIG. 7, mobile media device case system 700 includes media device case 210 that is fully assembled. In FIG. 7, media device case 210 includes first section 230 and second section 240 as described in relation to FIGS. 2 and 3, overlying one another. Elements similarly numbered with the last two significant digits and described in FIGS. 1-6 function in a substantially similarly way. In FIG. 7, media device case 210 may include elements not relevant to the present discussion.

In FIG. 7, media device case 210 is a multiple-piece mobile media device case that includes: second section 240 having interior main back portion 241 including left back portion 242 and right back portion 243, and first section 243 partially underlying the first section and having right back portion 232 and left back portion 233. Further, the perimeter of media device case 210 is defined by lower left outer edge 236, upper left outer edge 247, upper right outer edge 237, lower right outer edge 246, and hardware interface portion 120. FIG. 7 illustrates an interior view of a fully assembled media device case 210 after the user configuration or assembly process described in relation to FIGS. 4 and 5 above.

Figure 8:
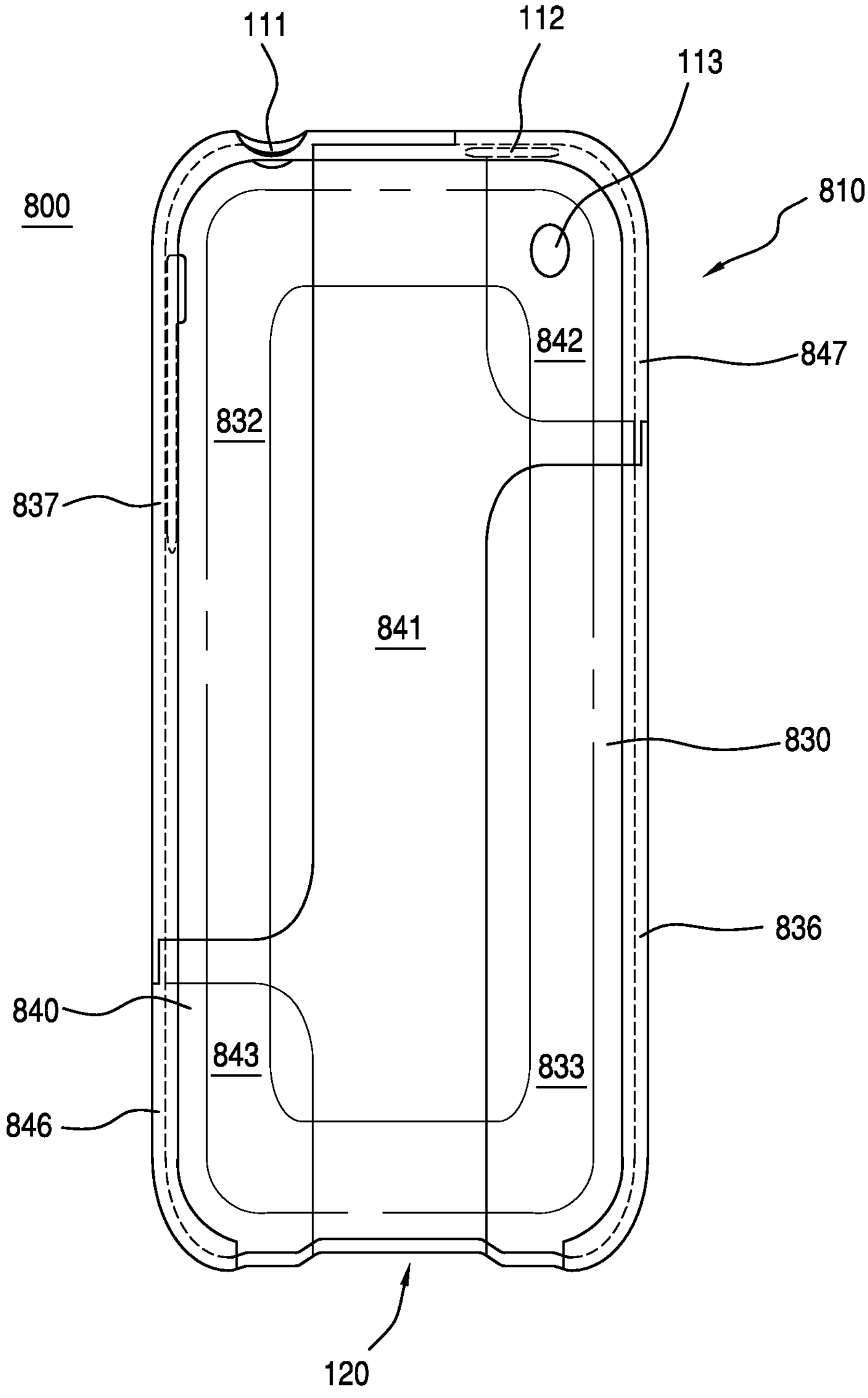
FIG. 8 illustrates a front or interior view of a second embodiment of an exemplary mobile media device case, in accordance with the subject matter described herein.

FIG. 8 illustrates a front or interior view of a second embodiment of an exemplary mobile media device case 810. In FIG. 8 for clarity, user configuration of media device case 810 is described without a mobile media device present. FIG. 8 shows a mobile media device case system 800 that includes media device case 810 that is fully assembled. In FIG. 8, media device case 810 includes a first section 830 and a second section 840 overlying one another. Elements numbered in a substantially similarly way with the last two significant digits and described in FIGS. 1-7 function in a substantially similarly way. In FIG. 8, media device case 810 may include elements not relevant to the present discussion.

Referring to FIG. 8, media device case 810 is a multiple-piece mobile media device case that includes: (a) a first section 830 partially underlying the second section and having upper back portion 832 and lower back portion 833, hardware interface portion 120, power switch portion 112 and headphone jack connector portion 113; and (b) a second section 840 having interior main back portion 841 upper back portion 842, lower back portion 843, and camera lense well 111.

Further, the perimeter of media device case 810 is defined by lower outer edge 836, upper outer edge 847, upper outer edge 837, lower outer edge 846 and hardware interface portion 120. FIG. 8 illustrates an interior view of a fully assembled media device case 810 after the user configuration or assembly process similar to the process described in relation to FIGS. 4 and 5 above.

Figure 9:
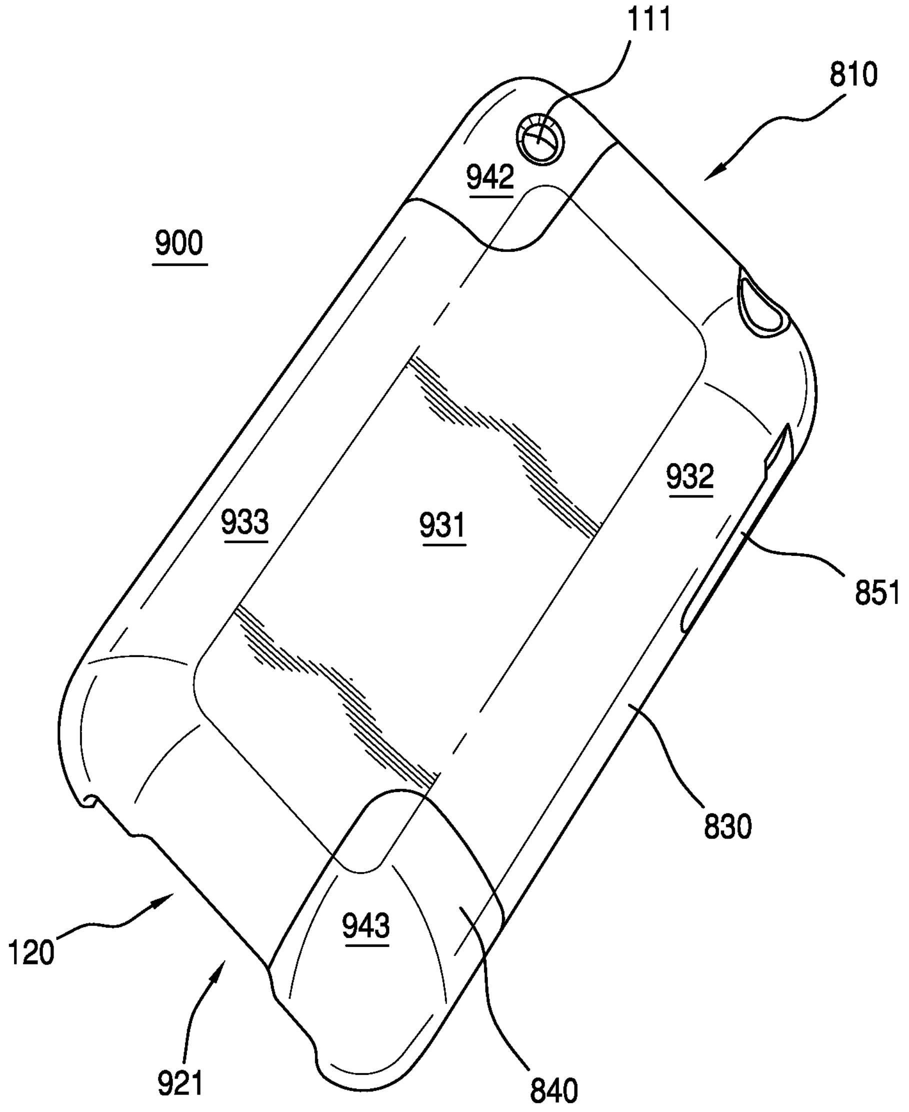
FIG. 9 illustrates a rear, bottom perspective view of the second embodiment of an exemplary mobile media device case of FIG. 8, in accordance with the subject matter described herein.

FIG. 9 illustrates a rear, bottom perspective view of the second embodiment of an exemplary mobile media device case 810. In FIG. 9 for clarity, user configuration of media device case 810 is described without a mobile media device present. In FIG. 9, rear exterior perspective 900 includes media device case 810 that is fully assembled. In FIG. 9, media device case 810 includes a first section 830 and a second section 840 overlying one another. Elements similarly numbered with the last two significant digits and described in FIGS. 1-8 function in a substantially similarly way. In FIG. 9, media device case 810 may include elements not relevant to the present discussion.

In FIG. 9, media device case 810 is a multiple-piece mobile media device case that includes: (a) a first section 830 partially overlying second section 840 and having an exterior main back portion 931 including upper back portion 932 and lower back portion 933, user interface portion 851, and hardware interface portion 120; and (b) a second section 840 including upper back portion 942, lower back portion 943, and camera lens well 111. FIG. 9 illustrates an exterior view of a fully assembled media device case 810 after the user configuration or assembly process similar to the process described in relation to FIGS. 4 and 5 above.

Figure 10:
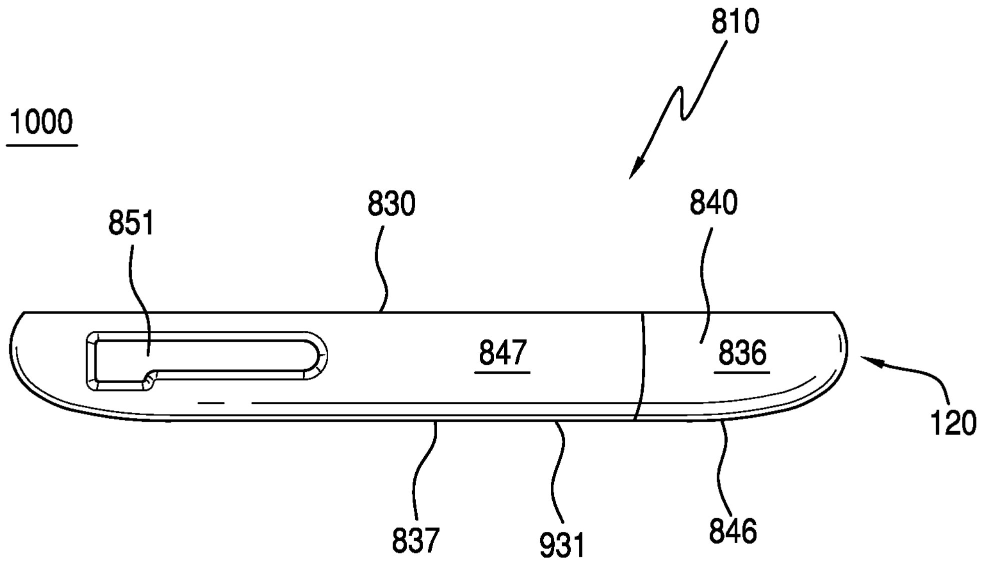
FIG. 10 illustrates a left side view of the second embodiment of the exemplary mobile media device case of FIG. 8, in accordance with the subject matter described herein.

FIG. 10 illustrates a left side view of the second embodiment of an exemplary mobile media device case 810. In FIG. 10 for clarity, media device case 810 is described without a mobile media device present. FIG. 10 shows a mobile media device case system 1000 with a media device case 810 that is fully assembled. In FIG. 10, media device case 810 includes a first section 830 and a second section 840 overlying one another. Elements similarly numbered with the last two significant digits and described in FIGS. 1-9 function in a substantially similarly way. In FIG. 10, media device case 810 may include elements not relevant to the present discussion.

A shown in FIG. 10, media device case 810 is a multiple-piece mobile media device case that includes: upper left outer edge 837, lower outer edge 846, exterior main back portion 931, interface portion 851, and hardware interface portion 120. FIG. 10 illustrates an exterior view of a fully assembled media device case 810 after the user configuration or assembly process similar to the process described in relation to FIGS. 4 and 5 above.

Figure 11:
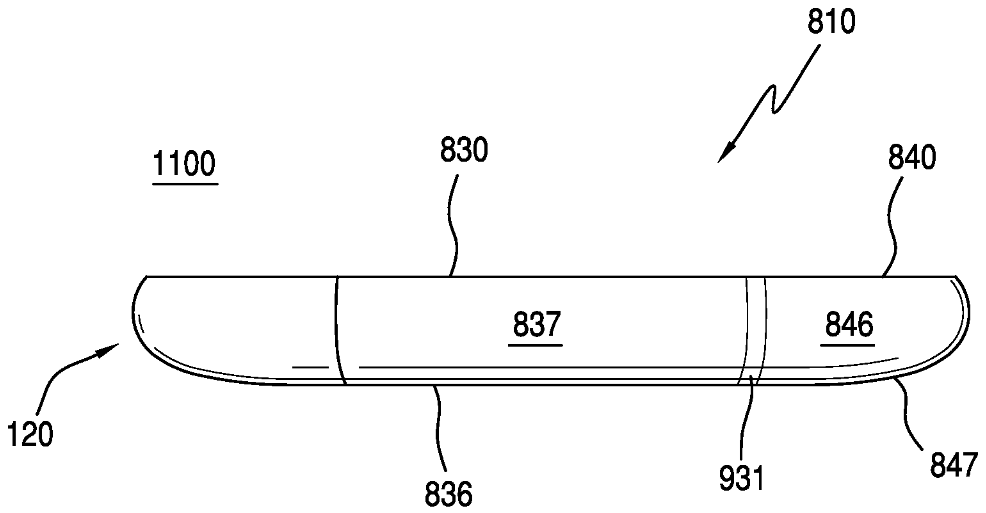
FIG. 11 illustrates a right side view of the second embodiment of the exemplary mobile media device case of FIG. 8, in accordance with the subject matter described herein.

FIG. 11 illustrates a right side view of the second embodiment of an exemplary mobile media device case 810. In FIG. 11 for clarity, media device case 810 is described without a mobile media device present. In FIG. 11, mobile media device case system 1100 includes media device case 810 that is fully assembled. In FIG. 11, media device case 810 includes a first section 830 and a second section 840 overlying one another. Elements similarly numbered with the last two significant digits and described in FIGS. 1-10 function in a substantially similarly way. In FIG. 11, media device case 810 may include elements not relevant to the present discussion.

As shown in FIG. 11, media device case 810 is a multiple-piece mobile media device case that includes: upper outer edge 847, lower outer edge 836, exterior main back portion 931, and hardware interface portion 120. FIG. 11 illustrates an exterior view of a fully assembled media device case 810 (less the mobile media device) after the user configuration or assembly process similar to the process described in relation to FIGS. 4 and 5 above.

Figure 12:
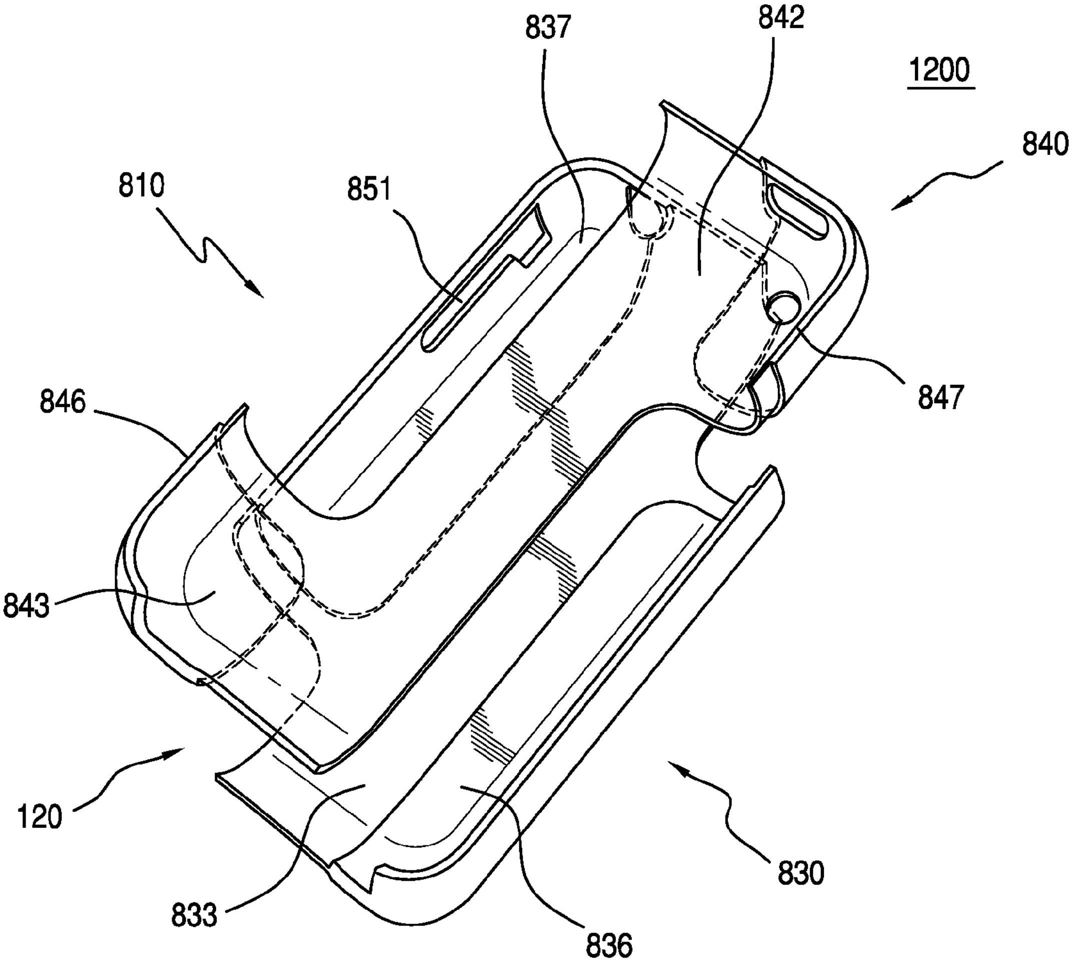
FIG. 12 illustrates a multi-piece, dismantled, front, bottom interior view of the media device case of FIG. 8 during the user configuration or assembly process, in accordance with the subject matter described herein.

FIG. 12 illustrates a multi-piece, dismantled, front, bottom interior view of media device case 810 during the user configuration or assembly process. In FIG. 12 clarity, user configuration of media device case 810 is described without a mobile media device present. FIG. 12 illustrates a mobile media device case system 1200 with media device case 810 that is partially assembled. In FIG. 12, media device case 810 includes a first section 830 and a second section 840 partially overlying one another. Elements numbered in a substantially similarly way with the last two significant digits and described in FIGS. 1-11 function in a substantially similarly way. In FIG. 12, media device case 810 may include elements not relevant to the present discussion.

In some embodiments, a user configuring or assembling media device case 810 aligns second section 840 over first section 830. After proper alignment, the user applies sufficient force to first section 830 and second section 840 to lock in, snap, or otherwise complete the configuration of media device case 810.

Figure 13:
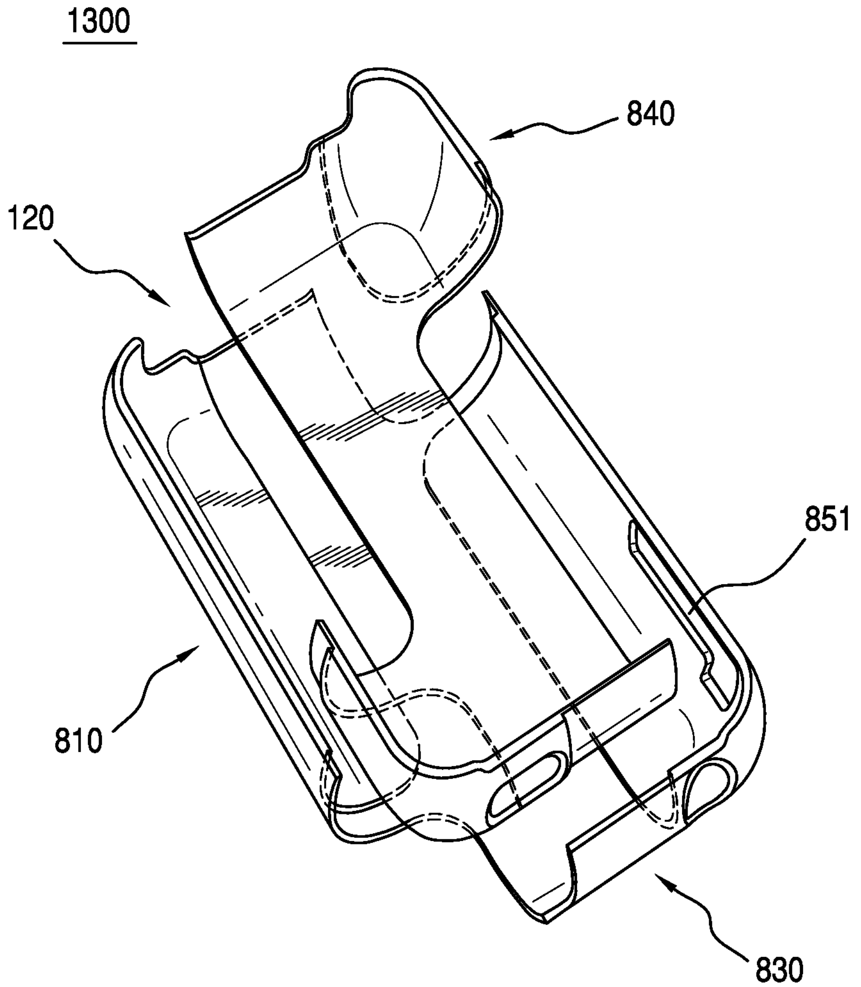
FIG. 13 illustrates another multi-piece, dismantled, front, top view of the media device case of FIG. 8 during the user configuration or assembly process, in accordance with the subject matter described herein.

FIG. 13 illustrates another multi-piece, dismantled, back, top view of media device case 810 during the user configuration or assembly process. In FIG. 13 for clarity, user configuration of media device case 810 is described without a mobile media device present. FIG. 13 shows a mobile media device case system 1300 with media device case 810 that is partially assembled. In FIG. 13, media device case 810 includes a first section 830 and a second section 840 partially overlying one another. Elements numbered in a substantially similarly way with the last two significant digits and described in FIGS. 1-12 function in a substantially similarly way. In FIG. 12, media device case 810 may include elements not relevant to the present discussion.

In some embodiments, a user configuring or assembling media device case 810 aligns second section 840 over first section 830. After proper alignment, the user applies sufficient force to first section 830 and second section 840 to lock in, snap, or otherwise complete the configuration of media device case 810.

Figure 14:
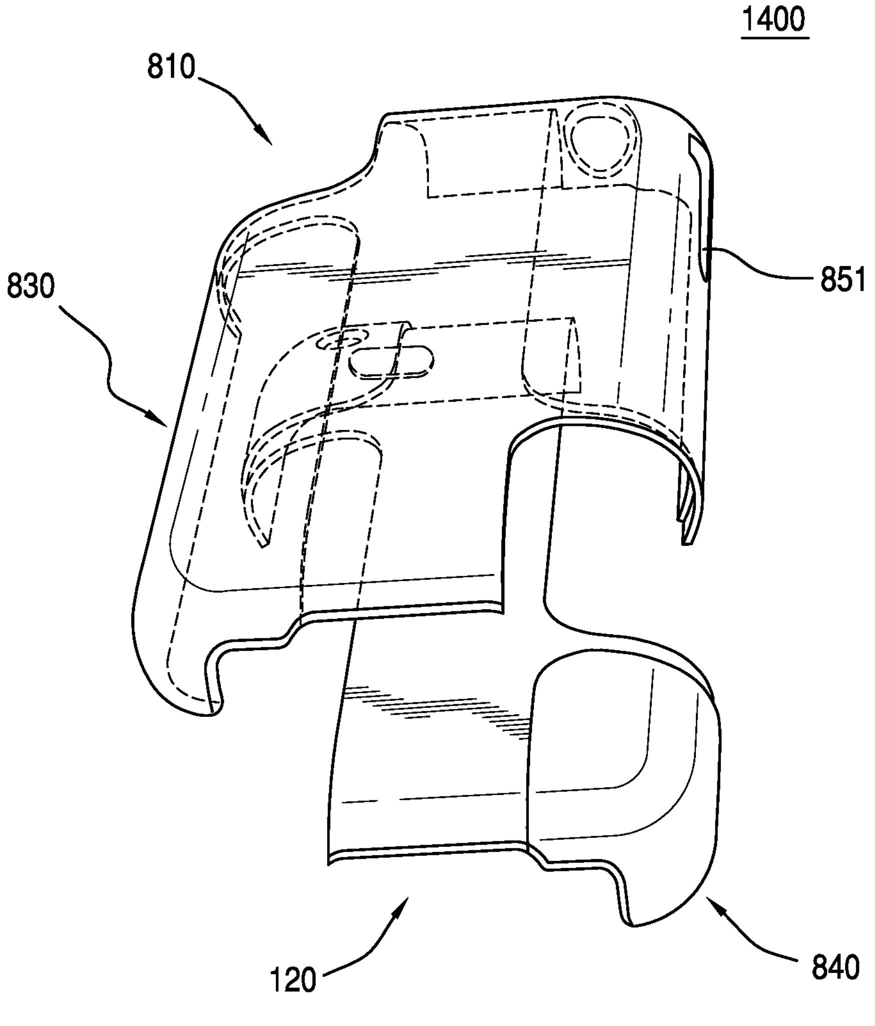
FIG. 14 illustrates a further multi-piece, dismantled, back, bottom view of the media device case of FIG. 8 during the user configuration or assembly process, in accordance with the subject matter described herein.

FIG. 14 illustrates a further multi-piece, dismantled, back, bottom view of media device case 810 during the user configuration or assembly process. In FIG. 14 for clarity, user configuration of media device case 810 is described without a mobile media device present. FIG. 14 shows a mobile media case system 1400 with media device case 810 that is partially assembled. In FIG. 14, media device case 810 includes a first section 830 and a second section 840 partially overlying one another. Elements numbered in a substantially similarly way with the last two significant digits and described in FIGS. 1-13 function in a substantially similarly way. In FIG. 14, media device case 810 may include elements not relevant to the present discussion.

In some embodiments, a user configuring a media device case 810 aligns first section 830 over second section 840. After proper alignment, the user applies sufficient force to first section 830 and second section 840 to lock in or otherwise complete the configuration of media device case 810.

Figure 15:
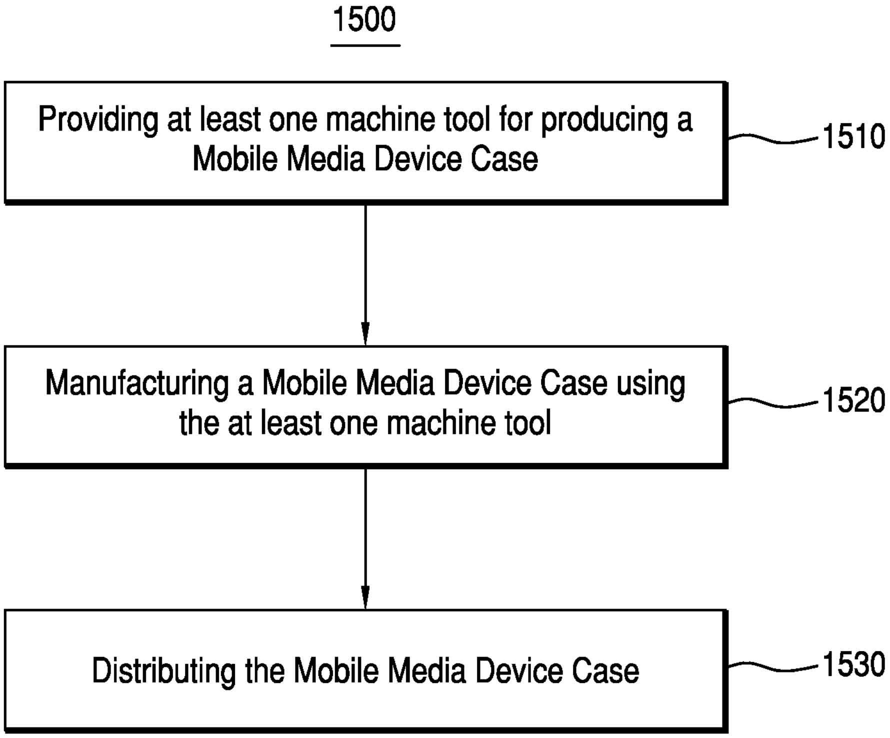
FIG. 15 illustrates an example of a method of manufacturing a portable device according to embodiments, in accordance with the subject matter described herein.

FIG. 15 illustrates an example of a method 1500 of manufacturing a portable device according to embodiments. In some embodiments, the activities of the method 1500 described in the flow chart of FIG. 15 can be performed in the order presented. In other embodiments, the activities of the method 1500 described in the flow chart of FIG. 15 can be performed in any other suitable order. In still other embodiments, one or more of the activities described in method 1500 can be combined.

Method 1500 of FIG. 15 includes an activity 1510 of providing at least one machine tool for a mobile media device case. In some embodiments, the at least one machine tool can be configured to produce a mobile media device case having a first section and a second section wherein one of the case sections is configured to overlie the other case section to form the mobile media device case. In an example and referring to FIGS. 1-7, the at least one machine tool can be configured to produce media device case 210 having first section 230 and second section 240. In another example and referring to FIGS. 8-14, the at least one machine tool is configured to produce media device case 810 having first section 830 and second section 840.

Method 1500 in FIG. 15 continues with an activity 1520 of manufacturing a mobile media device case using the at least one machine tool. In some embodiments, the at least one machine tool can include a machine tool that can injection mold a mobile media device enclosure. As an example, the injection mold process can use polycarbonate or another material that can be hardened or made rigid or semi-rigid to create the mobile media device enclosure.

Method 1500 in FIG. 15 continues with an activity 1530 of distributing the mobile media device case. In some embodiments, distributing the mobile media device case includes packaging and shipping one or more packaged mobile media device case through a distribution channel. In other embodiments, distributing the mobile media device case includes selling and shipping one or more mobile media device enclosures through a distribution channel.

Although aspects of the subject matter described herein have been described with reference to specific embodiments, it will be understood by those skilled in the art that various changes may be made without departing from the scope of the subject matter described herein. Accordingly, the disclosure of embodiments is intended to be illustrative of the scope of the subject matter described herein and is not intended to be limiting. It is intended that the scope of the subject matter described herein shall be limited only to the extent required by the appended claims. To one of ordinary skill in the art, it will be readily apparent that the devices and method discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment, and may disclose alternative embodiments.

All elements claimed in any particular claim are essential to the subject matter described herein and claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A mobile communications device case configured to receive a mobile communications device, the mobile communications device comprising a back section and one or more side sections, the mobile communications device case comprising:

a first portion, the first portion comprising a first back wall and a plurality of first sidewalls, the first back wall and the plurality of first sidewalls at least partially define a first interior of the first portion and a first exterior of the first portion, the first interior is configured to receive and partially cover at least a first part of the back section and the one or more side sections of the mobile communications device; and a second portion, the second portion comprising a second back wall and a plurality of second sidewalls, the second back wall and the plurality of second sidewalls at least partially define a second interior of the second portion and a second exterior of the second portion, the second interior is configured to receive the first exterior of the first portion and partially cover at least a second part of the back section and the one or more side sections of the mobile communications device, wherein:

the first portion and the second portion are configured such that the first interior of the first portion and the second interior of the second portion form a case interior having a substantially uniform surface when the first exterior of the first portion is received within the second interior of the second portion;

the first portion and the second portion are further configured such that the first exterior of the first portion and the second exterior of the second portion form a case exterior having a substantially uniform surface when the first exterior of the first portion is received within the second interior of the second portion;

at least a first sidewall of the plurality of first sidewalls of the first portion form a first part of a top of a front of the case;

at least a second sidewall of the plurality of first sidewalls of the first portion further form a first part of a bottom of the front of the case;

at least a first sidewall of the plurality of second sidewalls of the second portion form a second part of the top of the front of the case;

at least a second sidewall of the plurality of second sidewalls of the second portion further form a second part of the bottom of the front of the case; and the top of the case is opposite the bottom of the case.

2. The mobile communications device case of claim 1, further comprises:

one or more third portions similar in shape to the first portion; and one or more fourth portions similar the second portion, wherein:

the first portion and the one or more third portions are interchangeable and the second portion and the one or more fourth portions are interchangeable such that any one of the second portion or the fourth portion can be coupled to any one of the first portion or the third portion.

3. The mobile communications device case of claim 1, further comprising the mobile communications device.

4. The mobile communications device case of claim 1, wherein:

the plurality of first sidewalls comprise a top sidewall, a bottom sidewall, a left sidewall, and a right sidewall;

the at least the first sidewall of the plurality of first sidewalls comprise at least the top sidewall of the plurality of first sidewalls;

the at least the second sidewall of the plurality of first sidewalls comprise at least the bottom sidewall of the plurality of first sidewalls; and the first back wall of the first portion includes:

a first main back portion, the first main back portion having a top, a bottom, a right side and a left side, the first main back portion is configured to at least partially cover a central area of the back section of the mobile communications device, the top of the first main back portion is mechanically coupled to the top sidewall of the plurality of first sidewalls, the bottom of the first main back portion is mechanically coupled to the bottom sidewall of the plurality of first sidewalls, the right side of the first main back portion is mechanically coupled to the right sidewall of the plurality of first sidewalls, the left side of the first main back portion is mechanically coupled to the left sidewall of the plurality of first sidewalls, the first main back portion having a first thickness;

a first right back portion, the first right back portion having a top, a bottom, a right side and a left side, the left side of the first right back portion is mechanically coupled to the top of the first main back portion, the bottom of the first right back portion is mechanically coupled to the right side of the first main back portion, the top of the first right back portion is mechanically coupled to the top sidewall of the plurality of first sidewalls, the right side of the first right back portion is mechanically coupled to the right sidewall of the plurality of first sidewalls, the first right back portion having a second thickness; and a first left back portion, the first left back portion having a top, a bottom, a right side and a left side, the right side of the first left back portion is mechanically coupled to the bottom of the first main back portion, the top of the first left back portion is mechanically coupled to the left side of the first main back portion, the bottom of the first left back portion is mechanically coupled to the bottom sidewall of the plurality of first sidewalls, the left side of the first left back portion is mechanically coupled to the left sidewall of the plurality of first sidewalls, the first left back portion having a third thickness.

5. The mobile communications device case of claim 4, wherein:

the plurality of second sidewalls comprise a top sidewall, a bottom sidewall, a left sidewall, and a right sidewall;

the at least the first sidewall of the plurality of second sidewalls comprise at least the top sidewall of the plurality of second sidewalls;

the at least the second sidewall of the plurality of second sidewalls comprise at least the bottom sidewall of the plurality of second sidewalls; and the second back wall of the second portion includes:

a second main back portion, the second main back portion having a top, a bottom, a right side and a left side, the second main back portion configured to at least partially cover the first main back portion of the first back wall of the first portion, the top of the second main back portion is mechanically coupled to the top sidewall of the plurality of second sidewalls, the bottom of the second main back portion is mechanically coupled to the bottom sidewall of the plurality of second sidewalls, the right side of the second main back portion is mechanically coupled to the right sidewall of the plurality of second sidewalls, the left side of the second main back portion is mechanically coupled to the left sidewall of the plurality of second sidewalls, the second main back portion having a fourth thickness;

a second right back portion, the second right back portion having a top, a bottom, a right side and a left side, the left side of the second right back portion is mechanically coupled to the bottom of the second main back portion, the top of the second right back portion is mechanically coupled to the right side of the second main back portion, the bottom of the second right back portion is mechanically coupled to the bottom sidewall of the plurality of second sidewalls, the right side of the second right back portion is mechanically coupled to the right sidewall of the plurality of second sidewalls, the second right back portion having a fifth thickness; and a second left back portion, the second left back portion having a top, a bottom, a right side and a left side, the right side of the second left back portion is mechanically coupled to the top of the second main back portion, the bottom of the second left back portion is mechanically coupled to the left side of the second main back portion, the top of the second left back portion is mechanically coupled to the top sidewall of the plurality of second sidewalls, the left side of the second left back portion is mechanically coupled to the left sidewall of the plurality of second sidewalls, the second left back portion having a sixth thickness.

6. The mobile communications device case of claim 5, wherein:

a thickness of the mobile communications device case is substantially equal to the first thickness of the first main back portion plus the fourth thickness of the second main back portion when the second portion overlies the first portion; and each of the second thickness of the first right back portion, the third thickness of the first left back portion, the fifth thickness of the second right back portion, and the sixth thickness of the second left back portion is substantially equal to the thickness of the mobile communications device case.

7. The mobile communications device case of claim 5, wherein:

the first right back portion comprises an interior portion that is a first part of the first interior of the first portion and an exterior portion that is a first part of the first exterior of the first portion, the second thickness is substantially equal to a distance from the interior portion of the first right back portion to the exterior portion of the first right back portion;

the first left back portion comprises an interior portion that is a second part of the first interior of the first portion and an exterior portion that is a second part of the first exterior of the first portion, the third thickness is substantially equal to a distance from the interior portion of the first left back portion to the exterior portion of the first left back portion;

the second right back portion comprises an interior portion that is a first part of the second interior of the second portion and an exterior portion that is a first part of the second exterior of the second portion, the fifth thickness is substantially equal to a distance from the interior portion of the second right back portion to the exterior portion of the second right back portion; and the second left back portion comprises an interior portion that is a second part of the second interior of the second portion and an exterior portion that is a second part of the second exterior of the second portion, the sixth thickness is substantially equal to a distance from the interior portion of the second left back portion to the exterior portion of the second left back portion.

8. The mobile communications device case of claim 1, wherein the plurality of first sidewalls include one or more user access areas, the one or more user access areas having one or more holes, the one or more user access areas are configured to provide user access to one or more portions of the mobile communications device.

9. The mobile communications device case of claim 1, wherein the plurality of first sidewalls include a hardware interface access area, the hardware interface access area has a hole, the hardware interface access area configured to facilitate mechanical and electrical coupling of a hardware interface cable connector with a hardware interface dock connector of the mobile communications device.

10. The mobile communications device case of claim 1, wherein:

the plurality of first sidewalls of the first portion form a right part of the top of the front of the case;

the plurality of first sidewalls of the first portion further form a left part of the bottom of the front of the case;

the plurality of second sidewalls of the second portion form a left part of the top of the front of the case;

the plurality of second sidewalls of the second portion further form a right part of the bottom of the front of the case;

the left part of the top of the front of the case is opposite the right part of the top of the front of the case; and the left part of the bottom of the front of the case is opposite the right part of the bottom of the front of the case.

11. A mobile communications case system configured to enclose a mobile communications device, the mobile communications device comprising a back section and two or more side sections, a mobile communications case system comprising:

a case, the case comprising:

a first section, the first section of the case including a first back wall and plurality of first sidewalls, the first back wall and the plurality of first sidewalls at least partially define a first interior of the first section and a first exterior of the first section, the first interior of the first section is configured to enclose and partially cover the back section and at least a first one of the two or more side sections of the mobile communications device; and a second section, the second section of the case including a second back wall and plurality of second sidewalls, the second back wall and the plurality of second sidewalls at least partially define a second interior of the second section and a second exterior of the second section, the second interior of the second section is configured to receive the first exterior of the first section and partially cover the back section and at least a second one of the two or more side sections of the mobile communications device, wherein:

at least a first sidewall of the plurality of first sidewalls of the first section at least partially defines a top right portion of a front of the case;

at least a second sidewall of the plurality of first sidewalls of the first section further at least partially defines a bottom left portion of the front of the case;

at least a first sidewall of the plurality of second sidewalls of the second section at least partially defines a top left portion of the front of the case;

at least a second sidewall of the plurality of second sidewalls of the second section further at least partially defines a bottom right portion of the front of the case;

the top right portion of the front of the case is opposite the bottom left portion of the front of the case;

the top left portion of the front of the case is opposite the bottom right portion of the front of the case;

the first section and the second section are configured such that the first interior of the first section and the second interior of the second section form a case interior having a substantially uniform surface when the first exterior of the first section is received within the second interior of the second section;

the first section and the second section are further configured such that the first exterior of the first section and the second exterior of the second section form a case exterior having a substantially uniform surface when the first exterior of the first section is received within the second interior of the second section;

the first exterior of the first section is a first color;

the second exterior of the second section is a second color; and the case is configured such that at least a second part of the second exterior of the second section overlays at least a first part of the first exterior of the first section such that a first part of the surface of the case exterior has a third color when the first exterior of the first section is received within the second interior of the second section; and the third color is different from the first color and the second color.

12. The mobile communications case system of claim 11, further comprising:

one or more third sections similar in shape to the first section; and one or more fourth sections similar in shape to the second section, wherein:

the first section and the one or more third sections are interchangeable and the second section and the one or more fourth sections are interchangeable such that any one of the second section or the fourth section can be coupled to any one of the first section or the third section.

13. The mobile communications device case of claim 11, further comprising the mobile communications device.

14. The mobile communications case system of claim 11, wherein:

the plurality of first sidewalls comprise a top sidewall, a bottom sidewall, a left sidewall, and a right sidewall;

the first back wall of the first section includes:

a first main back section, the first main back section having a top, a bottom, a right side and a left side, the first main back section is configured to at least partially cover a central area of the back section of the mobile communications device, the top of the first main back section is mechanically coupled to the top sidewall of the plurality of first sidewalls, the bottom of the first main back section is mechanically coupled to the bottom sidewall of the plurality of first sidewalls, the right side of the first main back section is mechanically coupled to the right sidewall of the plurality of first sidewalls, the left side of the first main back section is mechanically coupled to the left sidewall of the plurality of first sidewalls, the first main back section having a first thickness;

a first right back section, the first right back section having a top, a bottom, a right side and a left side, the left side of the first right back section is mechanically coupled to the top of the first main back section, the bottom of the first right back section is mechanically coupled to the right side of the first main back section, the top of the first right back section is mechanically coupled to the top sidewall of the plurality of first sidewalls, the right side of the first right back section is mechanically coupled to the right sidewall of the plurality of first sidewalls, the first right back section having a second thickness; and a first left back section, the first left back section having a top, a bottom, a right side and a left side, the right side of the first left back section is mechanically coupled to the bottom of the first main back section, the top of the first left back section is mechanically coupled to the left side of the first main back section, the bottom of the first left back section is mechanically coupled to the bottom sidewall of the plurality of first sidewalls, the left side of the first left back section is mechanically coupled to the left sidewall of the plurality of first sidewalls, the first left back section having a third thickness.

15. The mobile communications case system of claim 14, wherein:

the plurality of second sidewalls comprise a top sidewall, a bottom sidewall, a left sidewall, and a right sidewall;

the second back wall of the second section includes:

a second main back section, the second main back section having a top, a bottom, a right side and a left side, the second main back section configured to at least partially cover the first main back section of the first back wall of the first section, the top of the second main back section is mechanically coupled to the top sidewall of the plurality of second sidewalls, the bottom of the second main back section is mechanically coupled to the bottom sidewall of the plurality of second sidewalls, the right side of the second main back section is mechanically coupled to the right sidewall of the plurality of second sidewalls, the left side of the second main back section is mechanically coupled to the left sidewall of the plurality of second sidewalls, the second main back section having a fourth thickness;

a second right back section, the second right back section having a top, a bottom, a right side and a left side, the left side of the second right back section is mechanically coupled to the bottom of the second main back section, the top of the second right back section is mechanically coupled to the right side of the second main back section, the bottom of the second right back section is mechanically coupled to the bottom sidewall of the plurality of second sidewalls, the right side of the second right back section is mechanically coupled to the right sidewall of the plurality of second sidewalls, the second right back section having a fifth thickness; and a second left back section, the second right back section having a top, a bottom, a right side and a left side, the right side of the second left back section is mechanically coupled to the top of the second main back section, the bottom of the second left back section is mechanically coupled to the left side of the second main back section, the top of the second left back section is mechanically coupled to the top sidewall of the plurality of second sidewalls, the left side of the second left back section is mechanically coupled to the left sidewall of the plurality of second sidewalls, the second left back section having a sixth thickness.

16. The mobile communications case system of claim 15, wherein:

a thickness of the mobile communications device case is substantially equal to the first thickness of the first main back section plus the fourth thickness of the second main back section when the second section overlies the first section; and each of the second thickness of the first right back section, the third thickness of the first left back section, the fifth thickness of the second right back section, and the sixth thickness of the second left back section is substantially equal to the thickness of the mobile communications device case.

17. The mobile communications case system of claim 15, wherein:

the first right back section comprises an interior section that is a first part of the first interior of the first section and an exterior section that is a first part of the first exterior of the first section, the second thickness is substantially equal to a distance from the interior section of the first right back section to the exterior section of the first right back section;

the first left back section comprises an interior section that is a second part of the first interior of the first section and an exterior section that is a second part of the first exterior of the first section, the third thickness is substantially equal to a distance from the interior section of the first left back section to the exterior section of the first left back section;

the second right back section comprises an interior section that is a first part of the second interior of the second section and an exterior section that is a first part of the second exterior of the second section, the fifth thickness is substantially equal to a distance from the interior section of the second right back section to the exterior section of the second right back section; and the second left back section comprises an interior section that is a second part of the second interior of the second section and an exterior section that is a second part of the second exterior of the second section, the sixth thickness is substantially equal to a distance from the interior section of the second left back section to the exterior section of the second left back section.

18. The mobile communications device case system of claim 11, wherein the plurality of first sidewalls include one or more user access areas, the one or more user access areas having one or more holes, the one or more user access areas are configured to provide user access to one or more portions of the mobile communications device.

19. The mobile communications device case system of claim 11, wherein the plurality of first sidewalls include a hardware interface access area, the hardware interface access area has a hole, the hardware interface access area configured to facilitate mechanical and electrical coupling of a hardware interface cable connector with a hardware interface dock connector of the mobile communications device.

20. A method of manufacturing a mobile communications device case for a mobile communications device, the method comprising:

providing at least one machine tool for producing the mobile communications device case;

manufacturing the mobile communications device case using the at least one machine tool such that the mobile communications device case comprises:

a first portion, the first portion comprising a first back wall and plurality of first sidewalls, the first back wall and the plurality of first sidewalls at least partially define a first interior of the first portion and a first exterior of the first portion, the first interior is configured to receive and partially cover at least a first part of a back section and one or more side sections of the mobile communications device; and a second portion, the second portion comprising a second back wall and plurality of second sidewalls, the second back wall and the plurality of second sidewalls at least partially define a second interior of the second portion and a second exterior of the second portion, the second interior is configured to receive the first exterior of the first portion and partially cover at least a second part of the back section and the one or more side sections of the mobile communications device, and wherein: the first portion and the second portion are configured such that the first interior of the first portion and the second interior of the second portion form a case interior having a substantially uniform surface when the first exterior of the first portion is received within the second interior of the second portion; and the first portion and the second portion are further configured such that the first exterior of the first portion and the second exterior of the second portion form a case exterior having a substantially uniform surface when the first exterior of the first portion is received within the second interior of the second portion; and distributing the mobile communications device case, wherein:

at least a first sidewall of the plurality of first sidewalls of the first portion form a first part of a top of a front of the case;

at least a second sidewall of the plurality of first sidewalls of the first portion further form a first part of a bottom of the front of the case;

at least a first sidewall of the plurality of second sidewalls of the second portion form a second part of the top of the front of the case;

at least a second sidewall of the plurality of second sidewalls of the second portion further form a second part of the bottom of the front of the case; and the top of the case is opposite the bottom of the case.

21. The method of claim 20, wherein manufacturing the mobile communications device case using the at least one machine tool includes using an injection molding process.

22. The method of claim 20, wherein distributing the mobile communications device case includes:

packaging the mobile communications device case; and shipping the mobile communications device case through a distribution channel.

23. The method of claim 20 wherein distributing the manufactured mobile communications device case includes: selling the mobile communications device case; and shipping the mobile communications device case through a distribution channel.

24. The method of claim 20, wherein the plurality of first sidewalls include one or more user access areas, the one or more user access areas having one or more holes, the one or more user access areas are configured to provide user access to one or more portions of the mobile communications device.

25. The method of claim 20, wherein the plurality of first sidewalls include a hardware interface access area, the hardware interface access area has a hole, the hardware interface access area configured to facilitate mechanical and electrical coupling of a hardware interface cable connector with a hardware interface dock connector of the mobile communications device.

26. The method of claim 20, wherein:

the plurality of first sidewalls of the first portion form a right part of the top of the front of the case;

the plurality of first sidewalls of the first portion further form a left part of the bottom of the front of the case;

the plurality of second sidewalls of the second portion form a left part of the top of the front of the case;

the plurality of second sidewalls of the second portion further form a right part of the bottom of the front of the case;

the left part of the top of the front of the case is opposite the right part of the top of the front of the case; and the left part of the bottom of the front of the case is opposite the right part of the bottom of the front of the case.

* * * * *